United States Patent
Song et al.

(10) Patent No.: US 12,557,009 B2
(45) Date of Patent: Feb. 17, 2026

(54) APPARATUS AND METHOD FOR E2 NODE CONTROL AND CELL CONTROL IN WIRELESS COMMUNICATION SYSTEM

(71) Applicant: SAMSUNG ELECTRONICS CO., LTD., Suwon-si (KR)

(72) Inventors: Junhyuk Song, Suwon-si (KR); Chulmin Kim, Suwon-si (KR); Chungkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 527 days.

(21) Appl. No.: 18/089,117

(22) Filed: Dec. 27, 2022

(65) Prior Publication Data

US 2023/0139546 A1  May 4, 2023

Related U.S. Application Data

(63) Continuation of application No. PCT/KR2022/012756, filed on Aug. 25, 2022.

(30) Foreign Application Priority Data

Aug. 25, 2021  (KR) .................. 10-2021-0112728

(51) Int. Cl.
*H04W 48/18* (2009.01)
*H04W 48/12* (2009.01)

(52) U.S. Cl.
CPC ........... *H04W 48/18* (2013.01); *H04W 48/12* (2013.01)

(58) Field of Classification Search
CPC ..... H04W 48/18; H04W 48/12; H04W 24/02; H04W 88/085; H04W 88/12; H04W 28/02; H04W 28/16

See application file for complete search history.

(56) References Cited

U.S. PATENT DOCUMENTS 10,638,356 B2 * 4/2020 Andrews ............. H04W 72/543
2020/0029242 A1  1/2020 Andrews et al.
(Continued)

FOREIGN PATENT DOCUMENTS

| CN | 111294982 | 6/2020 |
|----|-----------|--------|
| CN | 111567113 | 8/2020 |

(Continued)

OTHER PUBLICATIONS

3GPP TSG-RAN WG3 Meeting #113-e R3-213390, Aug. 16-27, 2021, 2 pages.
(Continued)

*Primary Examiner* — Gary Mui
*Assistant Examiner* — Yewon Kim
(74) *Attorney, Agent, or Firm* — Nixon & Vanderhye, P.C.

(57) ABSTRACT

A method performed by a Distributed Unit (DU) (e.g., included in a 5G or 6G communication system) may include receiving a control message from a Radio Access Network (RAN) Intelligent Controller (RIC), wherein the control message includes control information for controlling Data Radio Bearer (DRB) allocation in each network slice, identifying, from a request message for setting one or more DRBs of a terminal, Single Network Slice Selection Assistance Information (S-NSSAI) of the one or more DRBs, and setting the number of DRBs allocatable in a network slice corresponding to the S-NSSAI, based on the control information.

14 Claims, 21 Drawing Sheets

(56) References Cited

U.S. PATENT DOCUMENTS

| | | | |
|---|---|---|---|
| 2020/0329381 A1 | 10/2020 | Chou et al. | |
| 2021/0153220 A1 | 5/2021 | Dai et al. | |
| 2021/0184989 A1 | 6/2021 | Wu et al. | |
| 2021/0235277 A1 | 7/2021 | Parekh et al. | |
| 2021/0235323 A1 | 7/2021 | Parekh et al. | |
| 2021/0235451 A1 | 7/2021 | Parekh et al. | |
| 2021/0235473 A1 | 7/2021 | Parekh et al. | |
| 2021/0377116 A1* | 12/2021 | Yeh | H04W 24/10 |
| 2022/0014963 A1* | 1/2022 | Yeh | G06N 3/045 |
| 2022/0264442 A1 | 8/2022 | Yang et al. | |
| 2022/0377616 A1* | 11/2022 | Ratnam | H04W 28/0268 |
| 2023/0055590 A1* | 2/2023 | Sivaraj | H04W 28/02 |
| 2024/0305533 A1* | 9/2024 | Bai | H04W 24/02 |

FOREIGN PATENT DOCUMENTS

| | | |
|---|---|---|
| CN | 111769988 | 7/2021 |
| EP | 3 739 923 | 11/2020 |
| EP | 3 780 804 | 2/2021 |
| WO | 2020/242987 | 12/2020 |

OTHER PUBLICATIONS

3GPP TSG-SA WG1 Meeting #83 S1-182771, Aug. 20-24, 2018, 6 pages.
International Search Report for PCT/KR2022/012756 dated Dec. 12, 2022, 7 pages.
Extended Search Report dated Jul. 31, 2024 in European Patent Application No. 22861739.5.

* cited by examiner

APPARATUS AND METHOD FOR E2 NODE CONTROL AND CELL CONTROL IN WIRELESS COMMUNICATION SYSTEM

CROSS-REFERENCE TO RELATED APPLICATIONS

This application is a continuation of International Application No. PCT/KR2022/012756 designating the United States, filed on Aug. 25, 2022, in the Korean Intellectual Property Receiving Office and claiming priority to Korean Patent Application No. 10-2021-0112728, filed on Aug. 25, 2021, in the Korean Intellectual Property Office, the disclosures of each of which are incorporated by reference herein in their entireties.

BACKGROUND

Field

The disclosure relates to an apparatus and method in which a Radio Access Network (RAN) Intelligent Controller (RIC) controls an E2 node and a cell/slice in a radio access network. The disclosure also relates to an apparatus and method for controlling an E2 node and a cell/slice through an E2 message conforming to an Open Radio Access Network (O-RAN) standard of a wireless communication system.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amounts of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research may be conducted in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Various embodiments of the disclosure may provide an apparatus and method in which a Radio Access Network (RAN) Intelligent Controller (RIC) controls an E2 node in a wireless communication system.

In addition, various embodiments of the disclosure may provides an apparatus and method in which an E2 node is set by an RIC supporting a specific mode so that a resource of the E2 node, cell, and slice is operated or set under the control of the RIC.

According to various embodiments of the disclosure, a method performed by a Distributed Unit (DU) may include receiving a control message from a Radio Access Network (RAN) Intelligent Controller (RIC), wherein the control message includes control information for controlling Data Radio Bearer (DRB) allocation in each network slice, identifying, from a request message for setting one or more DRBs of a terminal, Single Network Slice Selection Assistance Information (S-NSSAI) of the one or more DRBs, and setting the number of DRBs allocatable in a network slice corresponding to the S-NSSAI, based on the control information.

According to various embodiments of the disclosure, a method performed by an RIC may include generating a control message including control information for controlling DRB allocation for each network slice, and transmitting the control message to a DU. The control information may be used to adjust the number of DRBs allocatable in a network slice of the DU.

According to various embodiments of the disclosure, an apparatus performing operations using a DU may include transceiver, and at least one processor coupled with the transceiver. The at least one processor may be configured to receive a control message from an RIC, wherein the control message includes control information for controlling DRB allocation in each network slice, identify, from a request message for setting one or more DRBs of a terminal, S-NSSAI of the one or more DRBs, and set the number of DRBs allocatable in a network slice corresponding to the S-NSSAI, based on the control information.

According to various embodiments of the disclosure, an apparatus performing operations using an RIC may include transceiver, and at least one processor coupled with the transceiver. The at least one processor may be configured to generate a control message including control information for controlling DRB allocation for each network slice, and transmit the control message to a DU. The control information may be used to adjust the number of DRBs allocatable in a network slice of the DU.

An apparatus and method according to various embodiments of the disclosure may allow a Radio Access Network (RAN) Intelligent Controller (RIC) to control a resource of an E2 node, cell, and slice.

Advantages acquired in the disclosure are not limited to the aforementioned advantages, and other advantages not mentioned herein may be clearly understood from the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
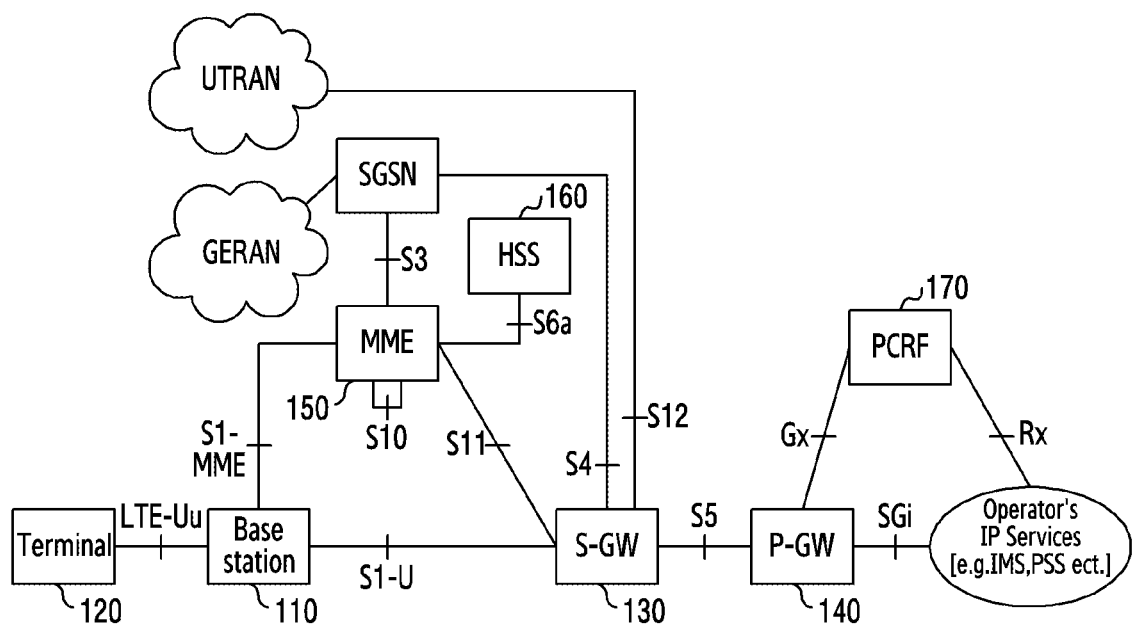
FIG. 1 illustrates an example of a 4$^{th}$ Generation (4G) Long Term Evolution (LTE) core system according to various embodiments.

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described by way of example in the various embodiments of the disclosure described hereinafter. However, since the various embodiments of the disclosure include a technique in which hardware and software are both used, a software-based approach is not excluded in the embodiments of the disclosure.

Hereinafter, the disclosure relates to an apparatus and method for performing a subscription procedure between a device in a Radio Access Network (RAN) and a device for controlling the RAN in a wireless communication system. Specifically, the disclosure relates to an apparatus and method for measuring per-terminal performance on an E2 interface in a radio access network and per-slice resource management of a base station. The disclosure relates to an apparatus and method for transferring a container-based measurement message when a service event occurs for a base station which conforms to an Open Radio Access Network (O-RAN) standard using an E2 message of the wireless communication system.

In the following description, terms referring to a signal, a channel, control information, network entities, and components of a device, or the like are used for convenience of explanation. Therefore, the disclosure is not limited to the terms described below, and other terms having the same technical meaning may also be used.

In addition, although an expression 'greater than' or 'less than' may be used in the disclosure to determine whether a specific condition is satisfied (or fulfilled), this is for purposes of example only and does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

In addition, although the disclosure describes various embodiments using terms used in some communication standards (e.g., 3$^{rd}$ Generation Partnership Project (3GPP), Open-Radio Access Network (O-RAN)), this is for purposes of example only. Various embodiments of the disclosure may be easily modified and applied to other communication systems.

Since a 4$^{th}$ Generation (4G)/5$^{th}$ Generation (5G) communication system (e.g., New Radio (NR)) has currently been commercialized, it is required to support a user-specific service in a virtualized network. The 3GPP is a joint research project between mobile communication-relevant organizations and is aiming at creating a 3G mobile communication system standard, applicable worldwide, within the scope of the IMT-2000 project of the International Telecommunication Union (ITU). The 3GPP was established in December 1998. The 3GPP standard is based on the advanced GSM standard, and includes radio and core networks and a service architecture within the scope of standardization. Accordingly, an Open Radio Access Network (O-RAN) has newly defined a Radio Unit (RU), a Distributed Unit (DU), a Central Unit (CU)-Control Plane (CP), and a CU-User Plane (UP), which are nodes constituting a 3GPP Network Entity (NE) and base station, respectively as an O-RAN (O)-RU, an O-DU, an O-CU-CP, and an O-CU-UP. In addition thereto, a Near-Real-Time (NRT) Radio access network Intelligent Controller (RIC) has been standardized. The disclosure is to support an operator specific service model in an E2 interface in which an RIC requests the O-DU, the O-CU-CP, or the O-CU-UP to provide a service. Herein, the O-RU, the O-DU, the O-CU-CP, and the O-CU-UP may be understood as objects constituting an RAN which may operate according to the O-RAN standard, and may be referred to as an E2 node. An interface with the objects constituting the RAN which may operate according to the O-RAN standard between the RIC and the E2 nodes uses an E2AP (Application Protocol).

The RIC is a logical node capable of collecting information in a cell site in which a terminal performs transmission/reception with respect to the O-DU, O-CU-CP, or O-CU-UP. The RIC may be realized, for example, in the form of a server deployed in one physical place in a concentrated manner. A connection between the O-DU and the RIC, between the O-CU-CP and the RIC, and between the O-CU-UP and the RIC may be established through the Ethernet. To this end, an interface standard for communication between the O-DU and the RIC, between the O-CU-CP and the RIC, and between the O-CU-UP and the RIC is required, and a message standard such as E2-DU, E2-CU-CP, and E2-CU-UP is required to define a procedure between the RIC and the O-DU, O-CU-CP, and O-CU-UP. In particular, a user-specific service is required in a virtualized network, and there is a need to define a function of a message of the O-DU, O-CU-CP, O-CU-UP, and RIC to support a service for wide cell coverage by allowing a call processing message/function generated in the O-RAN to be concentrated in the RIC.

The RIC may communicate with the O-DU, the O-CU-CP, and the O-CU-UP using the E2 interface, and may set an event occurrence condition by generating and transmitting a subscription message. Specifically, the RIC may generate an E2 subscription request message, and may transfer the message to the E2 node (e.g., O-CU-CP, O-CU-UP, O-DU) to set a call processing event. In addition, after setting the event, the E2 node may transmit a subscription request response message transferred to the RIC.

The E2 node may transmit a current status to the RIC through an E2 indication/report. The RIC may provide control for the O-DU, O-CU-CP, and O-CU-UP using an E2 control message. Various embodiments of the disclosure propose an E2 indication message transmitted as measurement information on a User Equipment (UE) basis, for each period set in the subscription event condition in the O-DU. In addition, various embodiments of the disclosure propose a message for controlling a resource transmitted from the RIC to the O-DU.

FIG. 1 illustrates an example of a 4$^{th}$ Generation (4G) Long Term Evolution (LTE) core system according to various embodiments.

Referring to FIG. 1, the LTE core system includes a base station 110, a terminal 120, a Serving Gateway (S-GW) 130, a Packet data network Gateway (P-GW) 140, a Mobility Management Entity (MME) 150, a Home Subscription Server (HSS) 160, and a Policy and Charging Rule Function (PCRF) 170. Furthermore, the LTE core system includes UTRAN (UMTS (universal mobile telecommunications service) terrestrial radio access network), GERAN (GSM (global system for mobile communications) EDGE (enhanced data rates for GSM evolution) radio access network), SGSN (serving GPRS support node), and operator's IP services (for example, IMS (IP multimedia subsystem), PSS (packet switch streaming)).

The base station 110 is a network infrastructure which provides radio access to the terminal 120. For example, the base station 110 is a device which performs scheduling by collecting state information such as a buffer state, available transmit power, channel state, or the like of the terminal 120. The base station 110 has coverage defined as a specific geographic region, based on a distance at which a signal is transmittable. The base station 110 is coupled to the MME 150 through an S1-MME interface, is coupled to the terminal 120 through a LTE-Uu interface, and is coupled to the S-GW 130 through a S1-U interface. Furthermore, The base station 110 may be referred to as not only the base station but also an 'Access Point (AP)', an 'eNodeB (eNB)', a 'wireless point', a 'Transmission/Reception Point (TRP)', or other terms having equivalent technical meanings.

The terminal 120 is a device used by a user, and performs communication through a wireless channel with respect to the base station 110. Optionally, the terminal 120 may operate without a user's involvement. That is, the terminal 120 may be a device which performs Machine Type Communication (MTC), and may not be carried by a user. The terminal 120 may be referred to as not only the terminal but also a 'User Equipment (UE)', a 'mobile station', a 'subscriber station', a Customer-Premises Equipment (CPE), a 'remote terminal', a 'wireless terminal', a 'user device', or other terms having equivalent technical meanings.

The S-GW 130 provides a data bearer, and creates or removes the data bearer under the control of the MME 150. For example, the S-GW 130 processes a packet arrived from the base station 110 or a packet to be forwarded to the base station 110. In addition, the S-GW 130 may perform an anchoring role when the terminal 120 performs a handover between base stations. S-GW 130 is coupled to the MME 150 through a S11 interface, is coupled to the SGSN through a S4 interface, and is coupled to the UTRAN through a S12 interface, is coupled to the P-GW through a S5 interface.

The P-GW 140 may function as a connectivity point with respect to an external network (e.g., an Internet network). In addition, the P-GW 140 allocates an Internet Protocol (IP) address to the terminal 120, and performs an anchoring role for the S-GW 130. In addition, the P-GW 140 applies a Quality of Service (QoS) policy of the terminal 120, and may manage account data. P-GW 140 is coupled to the PCRF through a Gx interface and is coupled to the operator's IP services through a 5GI interface.

The MME 150 manages mobility of the terminal 120. In addition, the MME 150 may perform authentication, bearer management, or the like for the terminal 120. That is, the MME 150 is responsible for mobility management and a variety of control functions. The MME 150 may interwork with a Serving GPRS Support Node (SGSN). The MME 150 is coupled to the MME 150 itself through a S10 interface, is coupled to the SGSN through a S3 interface, and is coupled to the HSS 150 through a S6a interface.

The HSS 160 stores a subscriber profile and key information for authentication of the terminal 120. The subscriber profile and the key information are transferred from the HSS 160 to the MME 150 when the terminal 120 accesses the network.

The PCRF 170 defines policy and charging rules. The stored information is transferred from the PCRF 170 to the P-GW 140, and the P-GW 140 may provide control (e.g., QoS management, charging, etc.) to the terminal 120, based on information provided from the PCRF 170. The PCRF 170 is coupled to the operator's IP services through a RX interface.

Carrier aggregation (hereinafter, 'CA') is a technology in which a plurality of component carriers are aggregated so that one terminal transmits/receives a signal using the plurality of component carriers simultaneously, thereby increasing frequency usage efficiency in terms of the terminal or the base station. Specifically, according to CA technology, the terminal and the base station may use the plurality of component carriers in each of an Uplink (UL) and a Downlink (DL) to transmit/receive a broadband signal. In this case, each of the component carriers is located at a different frequency band. Hereinafter, the UL refers, for example, to a communication link on which the terminal transmits a signal to the base station, and the DL refers, for example, to a communication link on which the base station transmits a signal to the terminal. In this case, the number of UL component carriers and the number of DL component carriers may be different from each other.

A dual connectivity or multi connectivity technology is a technology in which one terminal is coupled to a plurality of different base stations to transmit/receive a signal by simultaneously using carriers in each of the plurality of base stations located at different frequency bands, thereby increasing frequency usage efficiency in terms of the terminal or the base station. The terminal may transmit/receive traffic by being coupled simultaneously to a first base station (e.g., a base station which provides a service using an LTE technology or a 4G mobile communication technology) and a second base station (e.g., a base station which provides a service using a New Radio (NR) technology or a 5G mobile communication technology). In this case, a frequency resource used by each base station may be located at a different band. A scheme which operates based on the dual connectivity technology of the LTE and the NR may be called a 5G Non-Stand Alone (NSA).

Figure 2A:
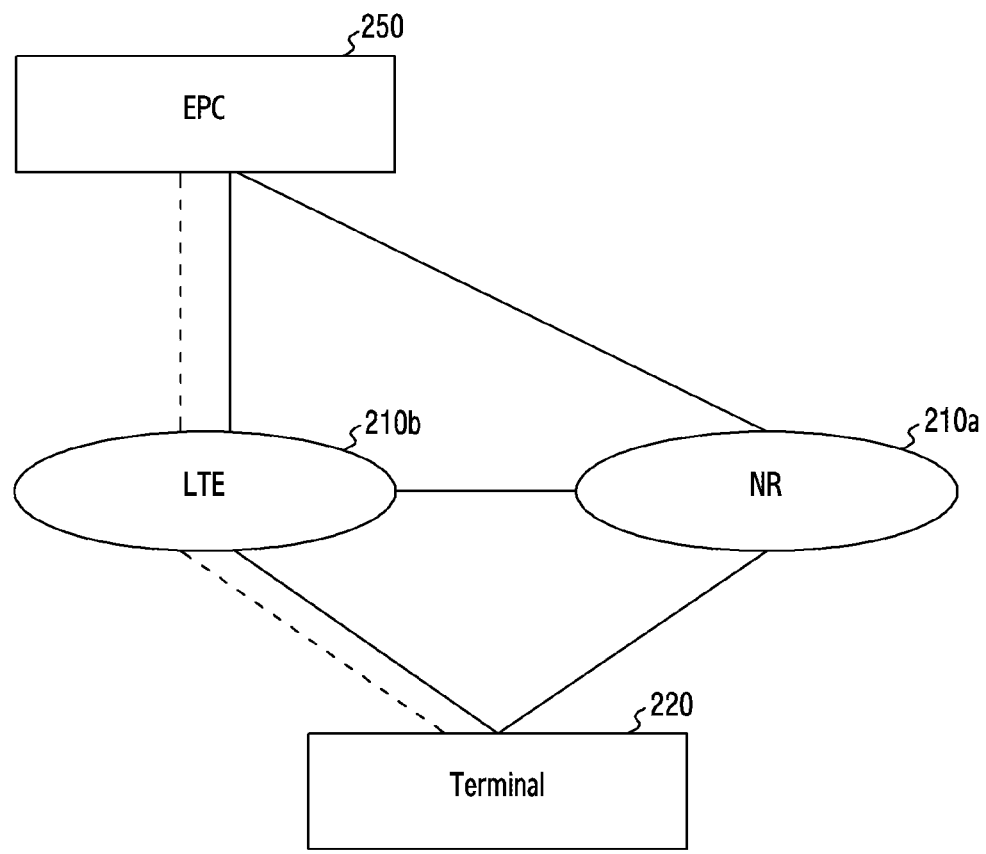
FIG. 2A illustrates an example of a 5$^{th}$ Generation (5G) Non-Stand Alone (NSA) system according to various embodiments.

FIG. 2A illustrates an example of a 5G NSA system according to various embodiments.

Referring to FIG. 2A, the 5G NSA system includes an NR RAN 210*a*, an LTE RAN 210*b*, a terminal 220, and an Evolved Packet Core (EPC) 250. The NR RAN 210*a* and the LTE RAN 210*b* may be coupled to the EPC 250, and the terminal 220 may receive a service from any one of, or simultaneously both, the NR RAN 210*a* and the LTE RAN 210*b*. The NR RAN 210*a* includes at least one NR base station, and the LTE RAN 210*b* includes at least one LTE base station. Herein, the NR base station may be referred to, for example, as a '5th generation node', a 'next generation NodeB (gNB)', or other terms having equivalent technical meanings. In addition, the NR base station may have a structure divided into a Central Unit (CU) and a Digital Unit (DU), and the CU may have a structure divided into a CU-Control Plane (CP) unit and a CU-User Plane (UP) unit.

In the structure of FIG. 2A, the terminal 220 may perform Radio Resource Control (RRC) access through a first base station (e.g., a base station belonging to the LTE RAN 210*b*), and may be provided a service of a function (e.g., connectivity management, mobility management, etc.) provided in a control plane. In addition, the terminal 220 may be provided an additional radio resource for transmitting/receiving data through a second base station (e.g., a base station belonging to the NR RAN 210*a*). The dual connectivity technology using the LTE and NR may be referred to as Evolved Universal Terrestrial Radio Access (E-URAN)-NR Dual Connectivity (DC) (EN-DC). Similarly, the dual connectivity technology in which the first base station uses the NR technology and the second base station uses the LTE technology is referred to as NR-E-UTRA Dual Connectivity (NE-DC). In addition, various embodiments may be applied to various types of multi connectivity and carrier aggregation technologies. In addition, various embodiments may also be applied to a case in which a first system using a first communication technology and a second system using a second communication technology are implemented in one device or a case in which the first base station and the second base station are located at the same geographic position.

Figure 2B:
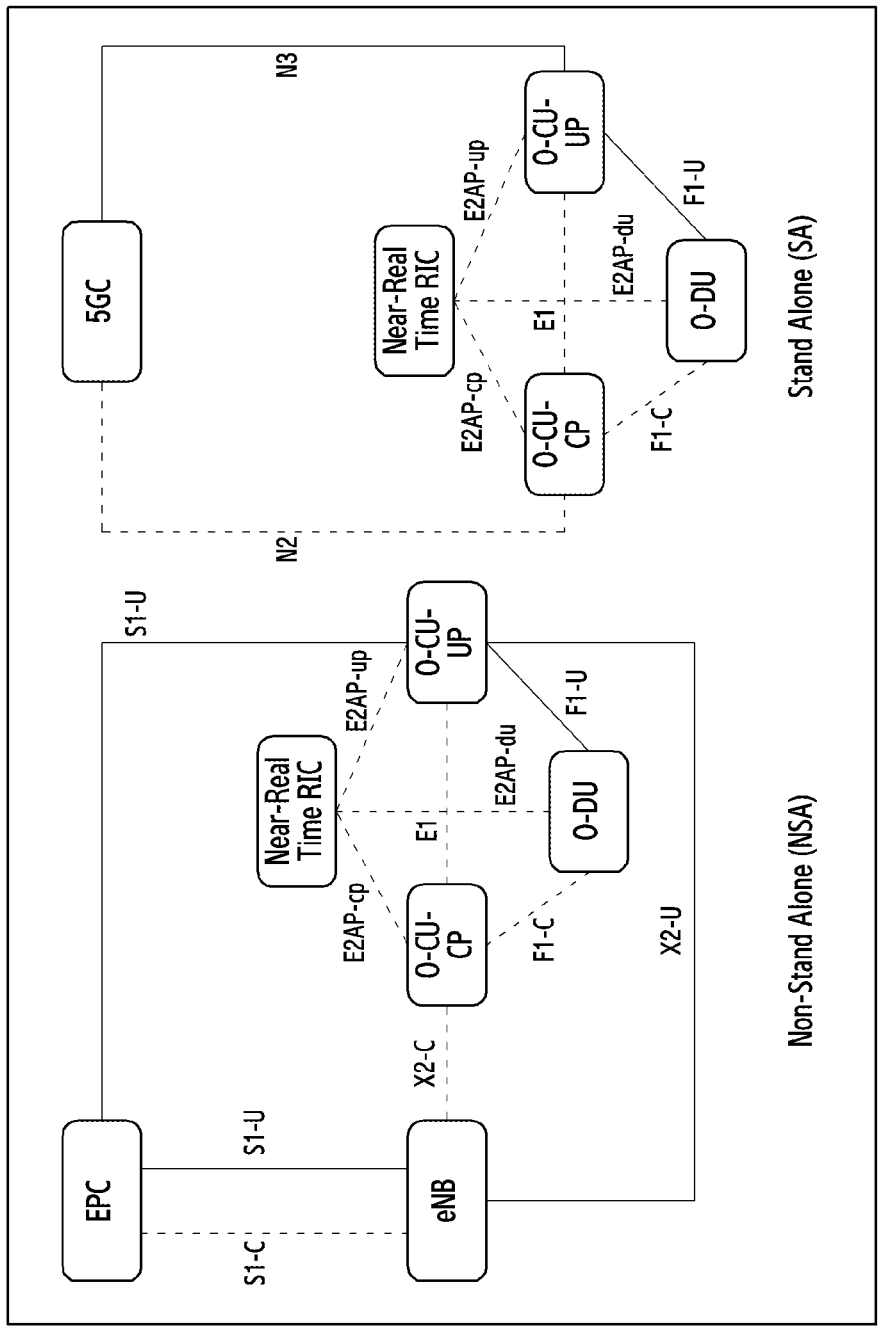
FIG. 2B illustrates an example of an architecture for an Open Radio Access Network (O-RAN) according to various embodiments.

FIG. 2B illustrates an example of an architecture for an O-RAN according to various embodiments. For the purpose of E2-SM-Key Performance Indicator (KPI) Monitoring (KPIMON) of an E2 service model, an O-RAN non-standalone mode in a multi-connectivity operation using an E-UTRA and NR radio access technology may be considered. Meanwhile, it may be assumed that an E2 node is in an O-RAN standalone mode.

Referring to FIG. 2B, in the deployment of the O-RAN non-standalone mode, an eNB is coupled to an EPC through an S1-C/S1-U interface, and is coupled to an O-CU-CP through an X2-C interface. The O-CU-CP for the deployment of the O-RAN standalone mode may be coupled to a 5G Core (5GC) through an N2/N3 interface. Furthermore, in the deployment both of the O-RAN non-standalone mode and standalone mode, an O-CU-CP is coupled to a Near-Real Time RIC through an E2AP-cp interface, is coupled to an O-DU through an F1-C interface, and is coupled to an O-CU-UP through an E1 interface. Furthermore, an O-CU-CP is coupled to a Near-Real Time RIC through an E2AP-up and is coupled to an O-DU through a F1-U.

Figure 3:
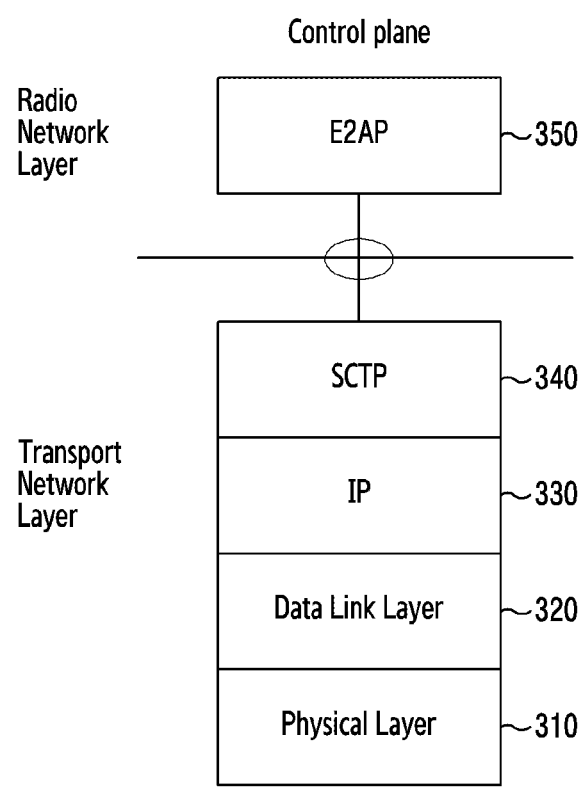
FIG. 3 illustrates a protocol stack of an E2 application protocol message in an example radio access network according to various embodiments.

FIG. 3 illustrates a protocol stack of an E2 application protocol message in a radio access network according to various embodiments of the disclosure. Referring to FIG. 3, a control plane includes a transport network layer and a radio network layer. The transport network layer includes a physical layer 310, a data link layer 320, an Internet Protocol (IP) 330, and a Stream Control Transmission Protocol (SCTP) 340.

The radio network layer includes an E2AP 350. The E2AP 350 is used to transfer a subscription message, an indication message, a control message, a service update message, and a service query message, and is transmitted in a higher layer than the SCTP 340 and IP 330.

Figure 4:
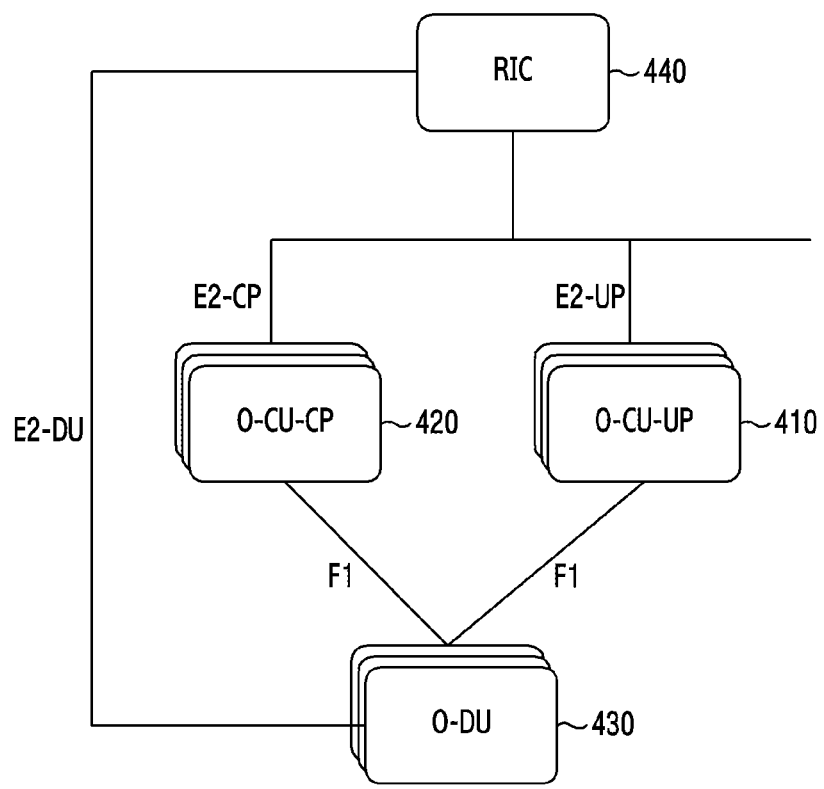
FIG. 4 illustrates an example of a connection between a base station and a Radio access network Intelligence Controller (RIC) in an example radio access network according to various embodiments.

FIG. 4 illustrates an example of a connection between a base station and an RIC in a radio access network according to various embodiments of the disclosure.

Referring to FIG. 4, an RIC 440 is coupled to an O-CU-CP 420, an O-CU-UP 410, and an O-DU 430. The RIC 440 is a device for customizing RAN functionality for a new service or regional resource optimization. The RIC 440 may provide a function such as network intelligence (e.g., policy enforcement, handover optimization), resource assurance (e.g., radio-link management, advanced Self-Organized Network (SON)), resource control (e.g., load balancing, slicing policy), or the like. The RIC 440 may perform communication with the O-CU-CP 420, the O-CU-UP 410, and the O-DU 430. The RIC 440 may be coupled to each node through E2-CP, E2-UP, and E2-DU interfaces. In addition, an interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

Although one RIC 440 is illustrated in FIG. 4 for example, a plurality of RICs may be present according to various embodiments. The plurality of RICs may be implemented with a plurality of hardware entities located at the same physical position or may be implemented through virtualization using one hardware entity.

Figure 5:
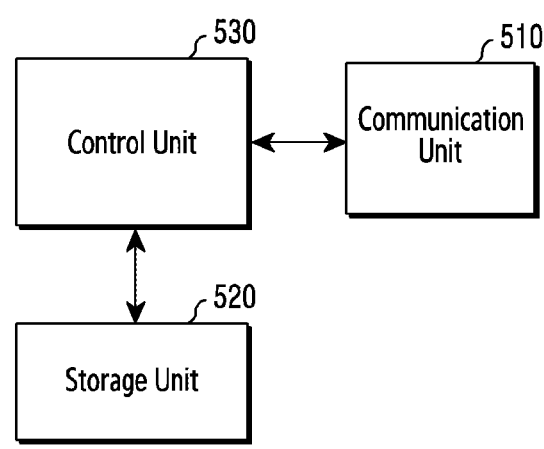
FIG. 5 illustrates a structure of an example device according to various embodiments.

FIG. 5 illustrates a structure of an example device according to various embodiments of the disclosure. The example structure of FIG. 5 may be understood as a structure of a device which performs at least one function among the near-RT RIC, non-RT RIC, O-CU-CP, O-CU-UP, and O-DU of FIG. 4. Hereinafter, the term '... unit', '... device', or the like implies a unit of processing at least one function or operation, and may be implemented in hardware or software or in combination of the hardware and the software.

Referring to FIG. 5, a core network device includes a communication unit 510, a storage unit 520, and a control unit 530.

The communication unit 510 (e.g., including communication circuitry) provides an interface for preforming communication with different nodes in a network. That is, the communication unit 510 converts a bit-stream transmitted from the core network device to a different device, and converts a physical signal received from the different device into a bit-stream. That is, the communication unit 510 may transmit and receive a signal. Accordingly, the communication unit 510 may be referred to as a transmitter, a receiver, or a transceiver. In this case, the communication unit 510 may allow the core network device to communicate with other devices or systems via a backhaul connection (e.g., a wired backhaul or a wireless backhaul).

The storage unit 520 stores a basic program, application program, setup information, or the like for an operation of the core network device. The storage unit 520 may be include a volatile memory, a non-volatile memory, or a combination of the volatile memory and the non-volatile memory. In addition, the storage unit 520 provides the stored data at the request of the control unit 530.

The control unit 530 controls overall operations of the core network device. For example, the control unit 530 transmits and receives a signal via the communication unit 510. In addition, the communication unit 530 writes data to the storage unit 520, and reads the data. For this, the control unit 530 may include at least one processor (e.g., including processing circuitry). According to various embodiments, the control unit 530 may control the core network device to perform operations in accordance with various embodiments described below.

Figure 6:
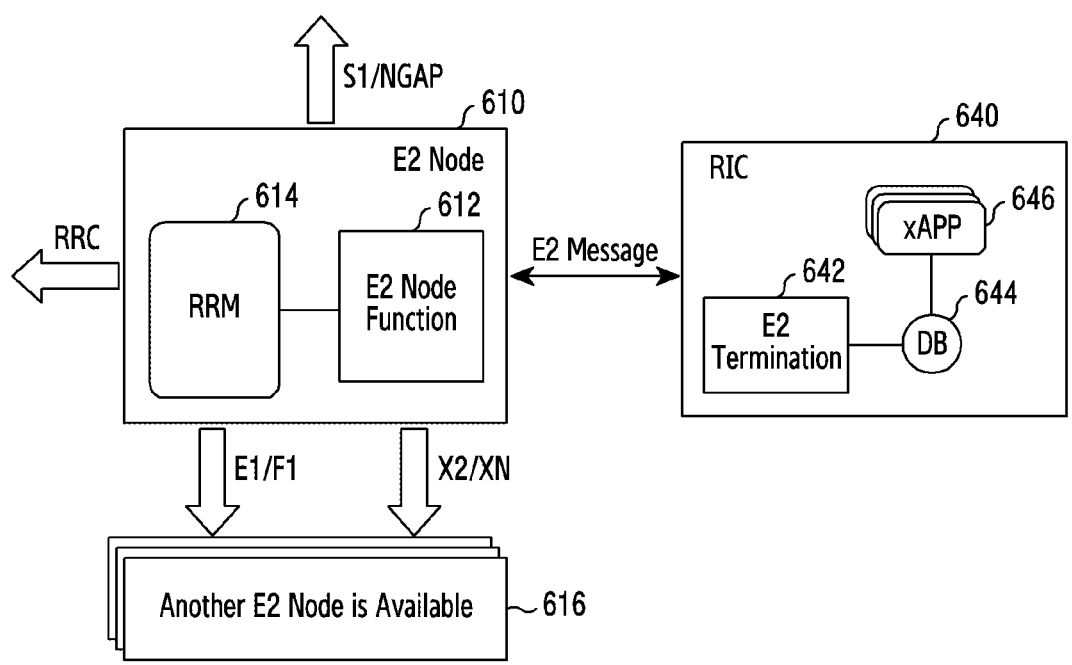
FIG. 6 illustrates a logical function relevant to an E2 message of an E2 node and RIC in an example radio access network according to various embodiments.

FIG. 6 illustrates a logical function relevant to an E2 message of an E2 node and RIC in an example radio access network according to various embodiments of the disclosure.

Referring to FIG. 6, an RIC 640 and an E2 node 610 may mutually transmit or receive an E2 message. For example, the E2 node 610 may be an O-CU-CP, an O-CU-UP, an O-DU, or a base station. A communication interface of the E2 node may be determined according to a type of the E2 node 610. For example, the E2 node 610 may perform communication with another E2 node 616 through an E1 interface or an F1 interface. Alternatively, for example, the E2 node 610 may perform communication with the E2 node 616 through an X2 interface or an XN interface. Alternatively, for example, the E2 node 610 may perform communication through an S1 interface or a Next Generation Application Protocol (NGAP) interface (i.e., an interface between a Next Generation (NG) RAN node and an AMF).

The E2 node 610 may include an E2 node function 612. The E2 node function 612 is a function corresponding to a specific application S/W (xApp) 646 installed in the RIC 640. For example, in case of a KPI monitor, a KPI monitor collection S/W is installed in the RIC 640, and the E2 node 610 may include the E2 node function 612 which generates KPI parameters and then transfers an E2 message including the KPI parameter to an E2 termination 642 located in the RIC 640. The E2 node 610 may include a Radio Resource Management (RRM) 614. The E2 node 610 may manage a resource provided to a radio network for a terminal.

The E2 termination 642 located in the RIC 640 is a termination of the RIC 640 for the E2 message, and performs a function which interprets the E2 message transferred by the E2 node 610 and then transfers it to the xApp 646. A Database (DB) 644 located in the RIC 640 may be used for the E2 termination 624 or the xApp 646. The E2 node 610 of FIG. 6 is a termination of at least one interface, and may be understood as a termination of messages to be transferred to the terminal, a neighboring base station, and a core network.

Figure 7:
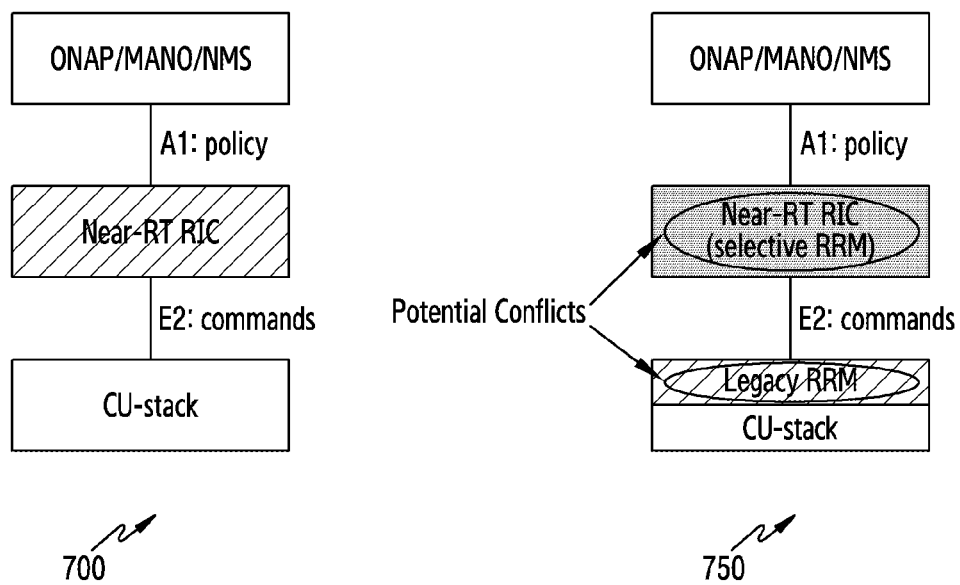
FIG. 7 illustrates examples of a function split between an E2 node and an RIC according various embodiments.

FIG. 7 illustrates examples of a function split between an E2 node and an RIC according various embodiments of the disclosure. An O-RAN standard provides a function split between the E2 node and the RIC. For example, the E2 node may be a CU. The RIC may be a near-RT RIC. The RIC may be coupled to an Open Network Automation Platform (ONAP)/Management and Orchestration (MANO)/Network Management System (NMS) through an A1 interface. The RIC may be coupled to the E2 node through an E2 interface. The E2 interface may transfer commands. A function split option may have a function split 700 in which the entirety of Radio Resource Management (RRM) is managed by a near-RT RIC and a function split 750 in which the RRM is selectively managed in the near-RT RIC.

According to the WG3 decision of the meeting of 2019 Jan. 16, the near-RT RIC is expected to support E2 as an open logical interface aiming at multi-vendor environments regardless of the implementation of a specific RRC-RRM algorithm located in the near-RT RIC. The disclosure may propose an E2 Service Model Radio Interface Control (E2SM-RIC) paired with an E2SM-NI capable of inserting/modifying/configuring a per UE RRC message for each I/F and Network Entity (NE). In other words, the near-RT RIC may be improved gradually in the direction from the function split 750 to the function split 700. The E2 may be developed as an open logical interface independent of the implementation of the specific RRC-RRM algorithm in the near-RT RIC and aiming at the multi-vendor environments.

Figure 8:
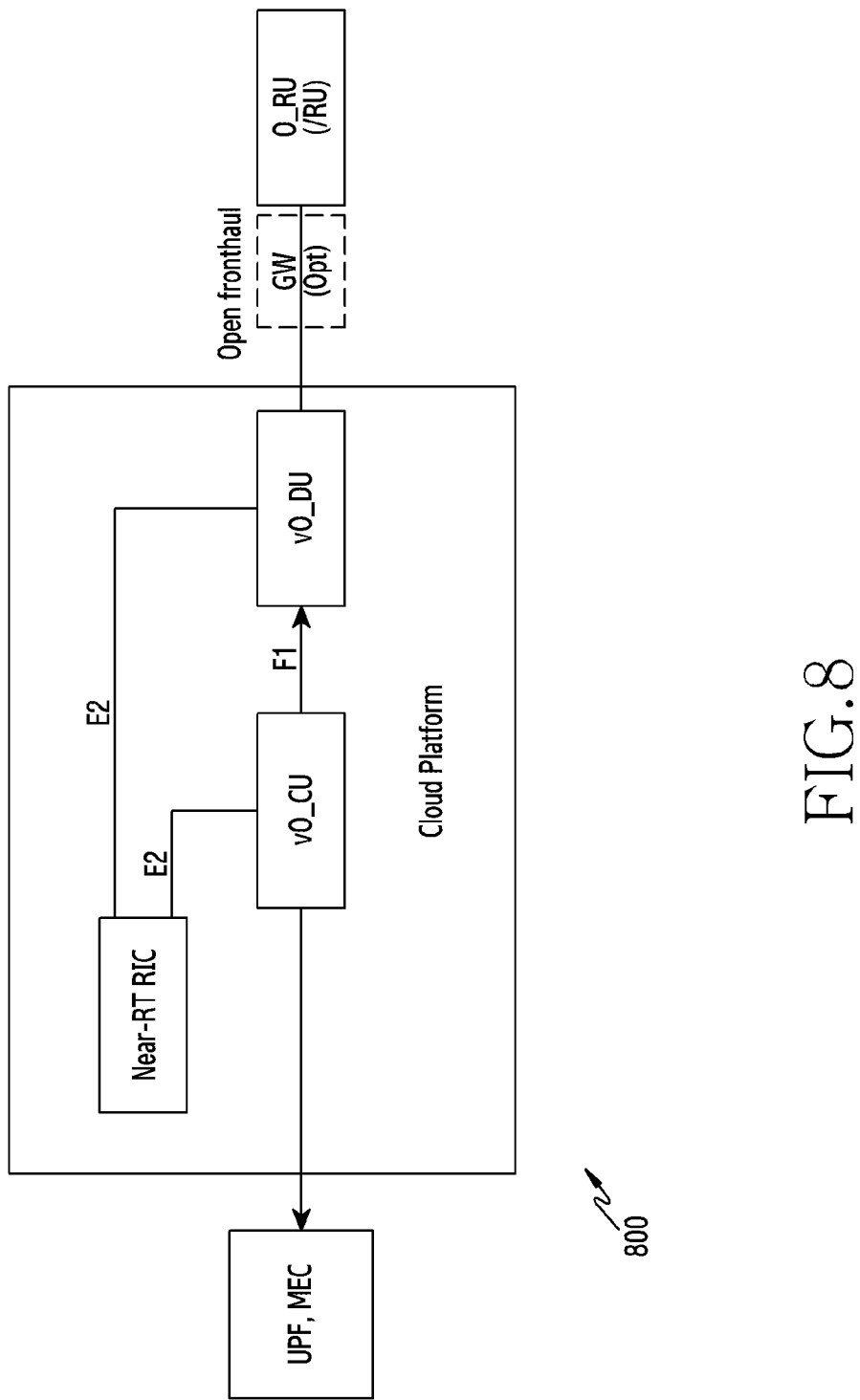
FIG. 8 illustrates an example of implementing an E2 node and an RIC according to various embodiments.

FIG. 8 illustrates an example of implementing an E2 node and an RIC according to various embodiments of the disclosure. In a scenario of an implementation example 800, the E2 node (e.g., O-DU, O-CU) and the RIC may be virtualized in a cloud platform (e.g., an open chassis and a blade specification edge cloud) and configured in a device (e.g., a server). This scenario may support deployment in densely populated urban areas with abundant fronthaul capacity allowing a BBU function which is pooled in a central location, with low enough latency to meet an O-DU waiting time requirement. Therefore, it may not be necessary to attempt to centralize an RIC close to an RT beyond a limit capable of centralizing an O-DU function. According to an embodiment, the E2SM-RIC may be optimized for O-RAN deployment scenarios in which the near-RT RIC, the O-CU, and the O-DU are implemented in the O-cloud platform.

Figure 9:
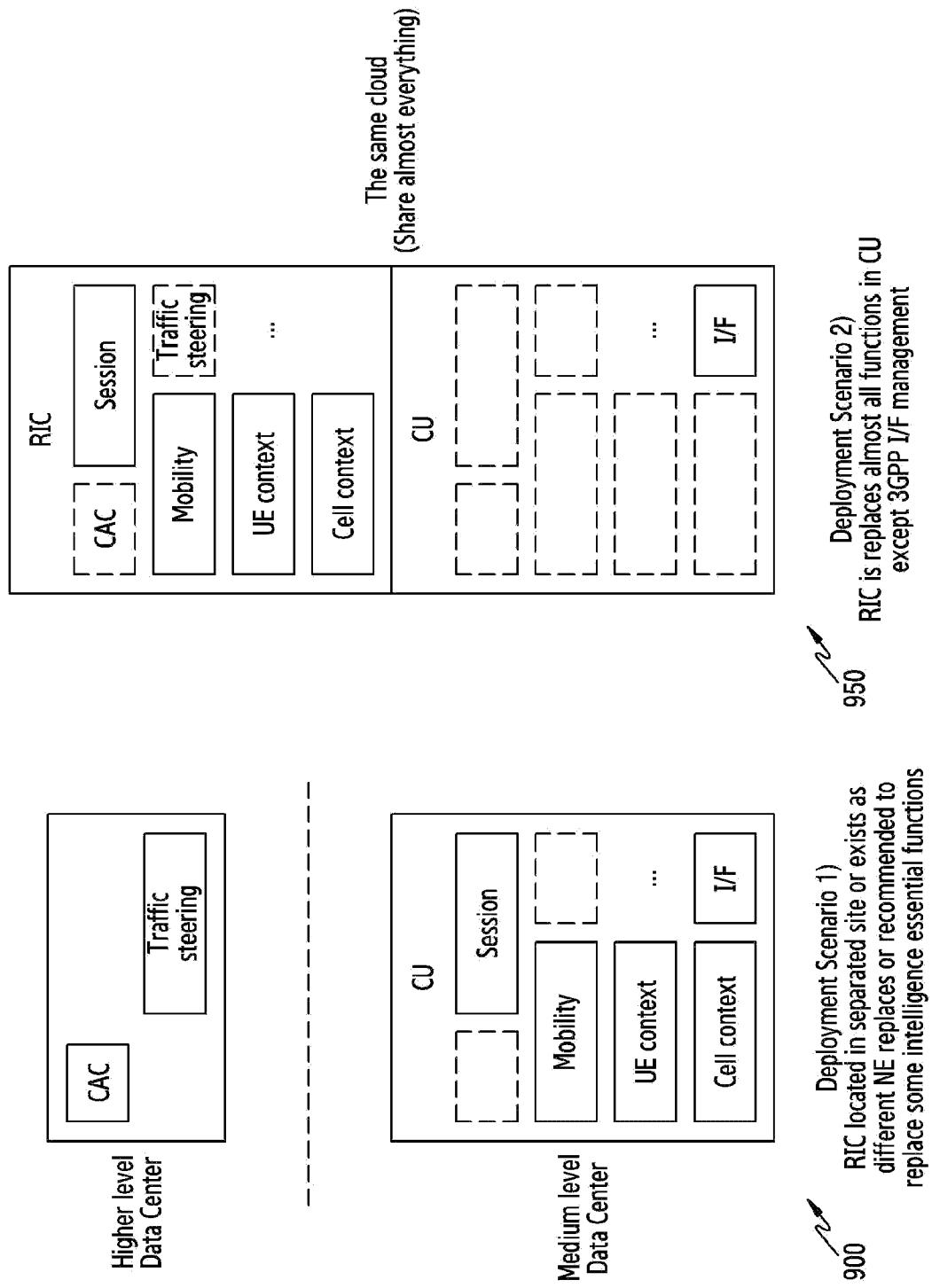
FIG. 9 illustrates examples of a function split between a Centralized Unit (CU) and an RIC according to various embodiments.

FIG. 9 illustrates examples of a function split between a Centralized Unit (CU) and an RIC according to various embodiments of the disclosure. Referring to FIG. 9, the function splits may be performed based on a deployment scenario #1 900 or a deployment scenario #2 950.

Deployment scenario #1 900: The RIC is located at a separate site or exists only as another NE, and replaces or is recommended to replace some intelligence essential functions.

Deployment scenario #2 950: The RIC may replace almost all functions of the CU except for 3GPP I/F management.

Although two scenarios are illustrated in FIG. 9, the other scenarios may also be applied. For example, in the deployment scenario #1 900, a mobility function may be performed by not the CU, but by the RIC. In addition, for example, in the deployment scenario #1 900, a UE context function may be performed by not the CU, but by the RIC. In addition, for example, in the deployment scenario #1 900, a session setup function may be performed by not the CU, but by the RIC.

Figure 10:
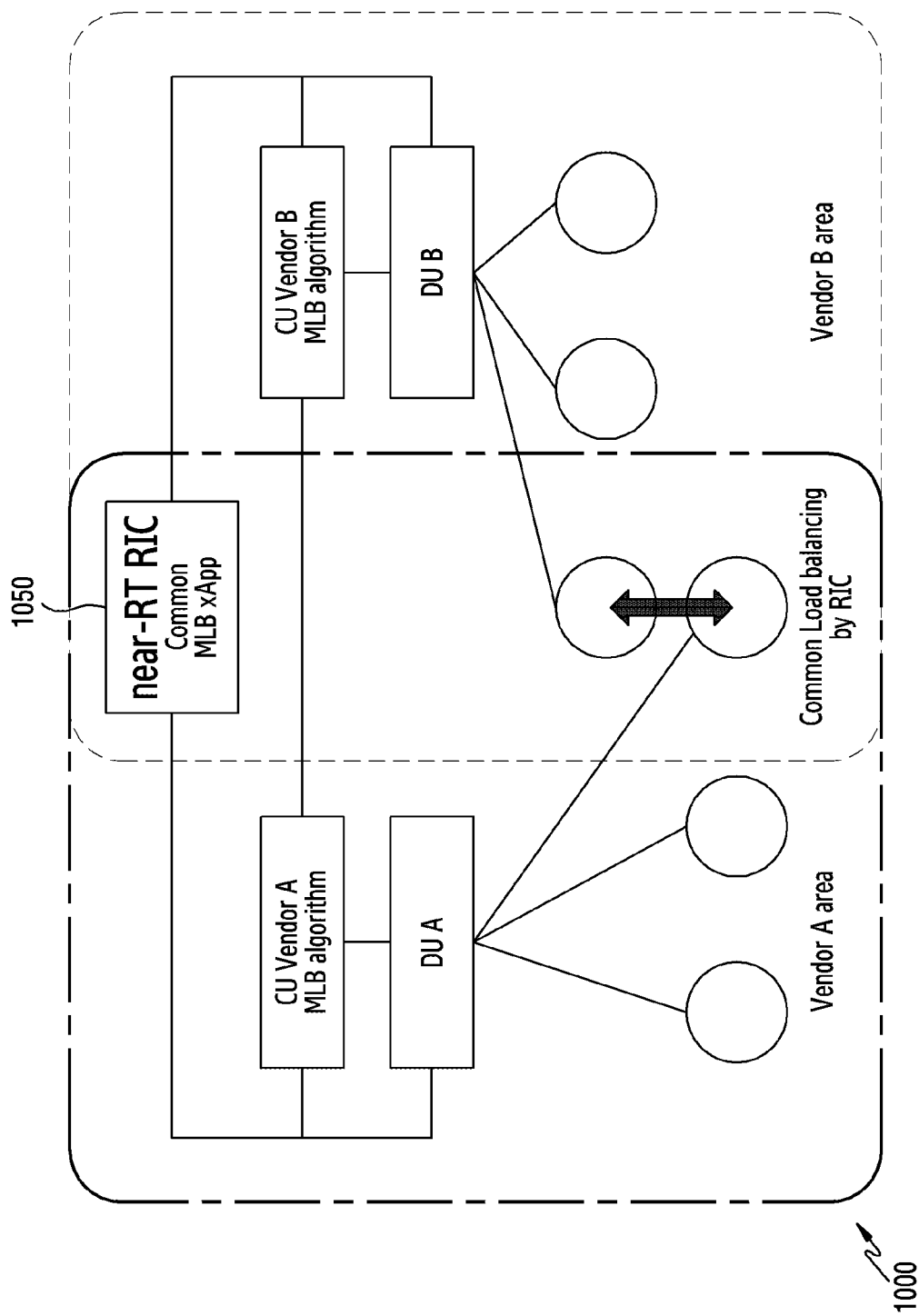
FIG. 10 illustrates an example of controlling Mobility Load Balancing (MLB) for different vendors according to various embodiments.

FIG. 10 illustrates an example of controlling Mobility Load Balancing (MLB) for different vendors according to various embodiments of the disclosure. The MLB may be performed under the control of RRM. A first CU and a first DU may be provided by a vendor A. A second CU and a second DU may be provided by a vendor B. The first DU may provide a service area of the vendor A. RUs coupled to the first DU may provide the service area of the vendor A. The second DU may provide a service area of the vendor B. RUs coupled to the second DU may provide the service area of the vendor B.

When a terminal moves, load balancing may be performed to know which cell is optimal. When the load balancing is performed by different vendors, it may be difficult to perform the load balancing smoothly in a space where the service areas of the vendors overlap. That is, it is required to perform interworking between vendors in an inter vendor zone or an inter CU-CP area. For the interworking between the vendors, it is required to perform the RRM control in a centralized manner. Therefore, the RIC according to various embodiments of the disclosure may be configured to perform the RRM. The RIC may generate a message for controlling each E2 node as well as simply receiving a measurement from each E2 node. The RIC may transmit a control message to each E2 node (e.g., DU or CU-CP, CU-UP).

Figure 11A:
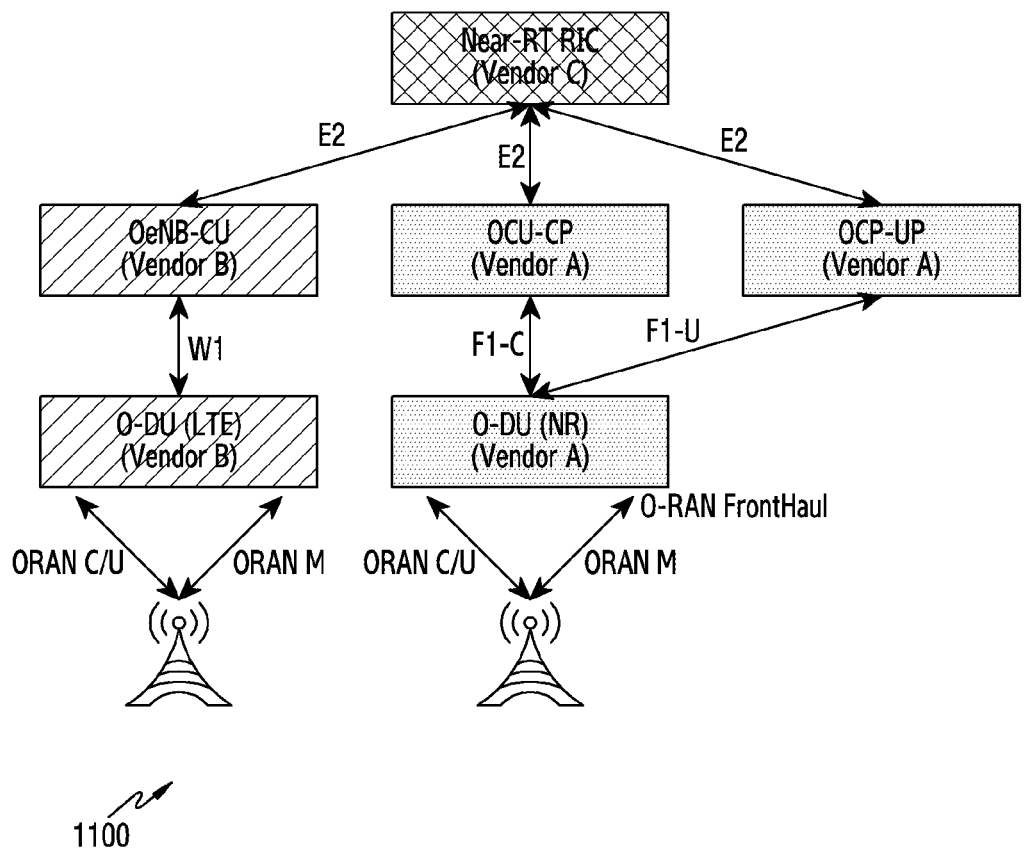
FIG. 11A illustrates an example of MLB control for different vendors according to various embodiments.

FIG. 11A illustrates an example of MLB control for different vendors according to various embodiments of the disclosure. First, unlike in FIG. 11A, when operating as a single vendor, RAN context may be identified in a near-RT RIC. In addition, trigger event, report, insert, policy conditions may operate. A control action may also operate, and a general sub-function definition approach may also operate. However, as shown in FIG. 11A, when operating as multi-vendors, the RAN context is not possibly identified in the near-RT RIC. In addition, the trigger event/report, insert, policy conditions do not operate. Due to a local RRM conflict, the control action does not operate or has no choice but to be dependent on an implementation.

A single E2SM-RAN control is difficult to operate properly in an O-RAN situation in a multi-vendor environment. Considering all RAN features, this is because there are a function parity and an operation parity. An RAN function parity refers, for example, to a difference in features related to RRM functions (e.g., Quality of Service (QoS) handover, Load Balancing (LB) handover, etc.). An RAN operation parity refers, for example, to a difference in features related to RAN operations (e.g., EN-DC SCG bearer change procedure). In addition thereto, operations for the report/insert/control/policy may identify correct RAN context. In addition, the operations for the report/insert/control/policy are not capable of identifying trigger event/conditions based on the report/insert/policy. In addition, a corresponding operation may have difficulty in referring to the RAN context in a specific deployment.

Referring to FIG. 11A, network entities are configured using a total of three vendors in a wireless communication environment 1100. A vendor A may be an NR provider. A vendor B may be an LTE provider. A vendor C may be an RIC provider. In order to solve the aforementioned problems, no matter which vendor's E2 node is coupled, one entity capable of managing all of them is required. Even if vendors are different from one another, since a near-RT RIC is capable of collecting all of measurement information thereof, the near-RT RIC may perform management and control more easily than other entities. Therefore, since the near-RT RIC performs the RRM in a centralized manner, a difference and compatibility issue between vendors may be solved. In addition, even if RATs are different from one another, the difference and compatibility issue between vendors may be solved.

Hereinafter, centralized RRM based on a near-RT RIC may be described in the disclosure by referring to terms such as a zombie mode of an RIC-based RRM control or E2 node, a zombie mode of an E2SM-RIC, an E2SM-RIC dedicated mode, or the like. Of course, other technical terms in which a function of each E2 node is performed by the RIC may be used in replacement of the terms exemplified above.

Figure 11B:
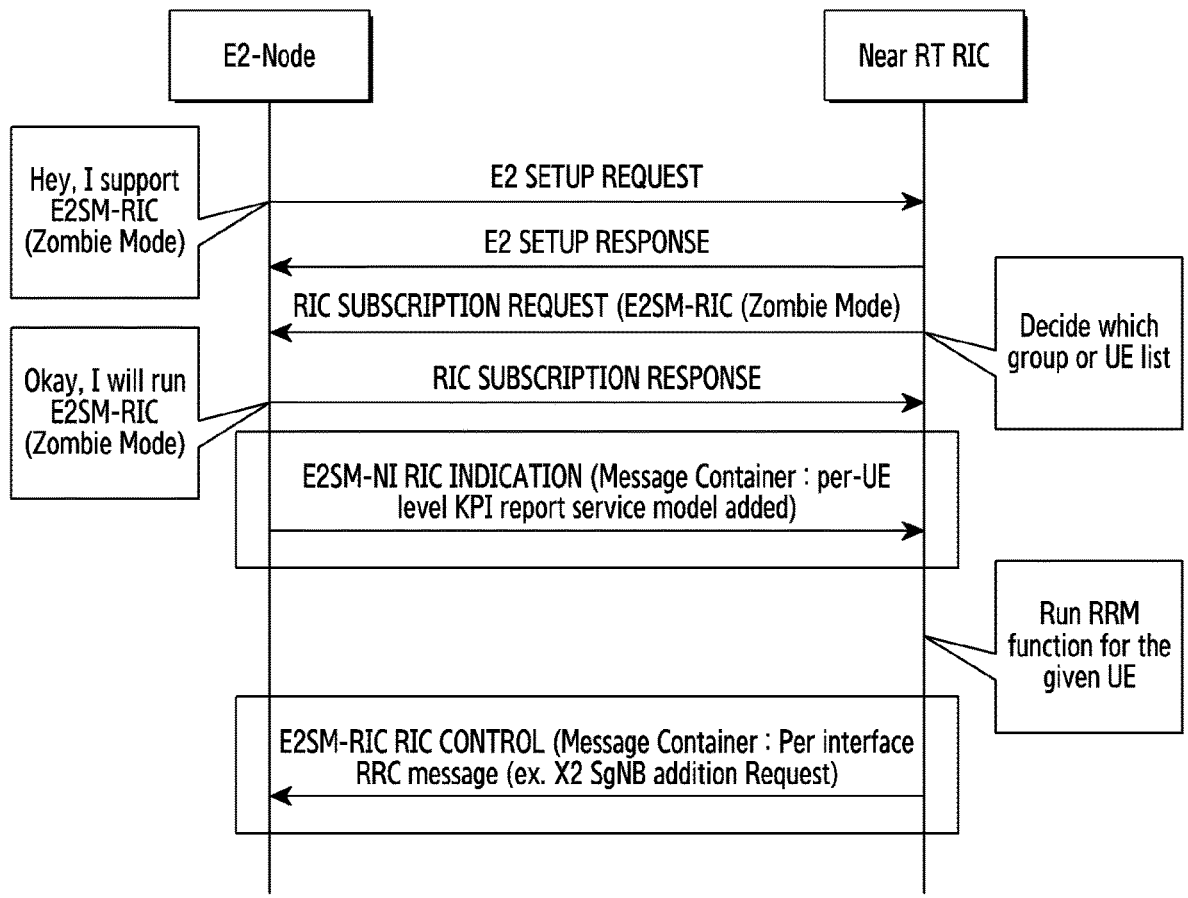
FIG. 11B illustrates signaling for Radio Resource Management (RRM) control setup of a near-RT RIC according to various embodiments.

FIG. 11B illustrates signaling for RRM control setup of a near-RT RIC according to various embodiments of the disclosure. An example of a signaling procedure between an E2 node and an RIC is illustrated in FIG. 11B. Specifically, an E2 I/F setup procedure between the E2 node and the RIC and a RIC subscription message transfer procedure are illustrated in FIG. 11B. In addition, a procedure of transferring an RIC indication message and an RIC control message is illustrated in FIG. 11B.

Referring to FIG. 11B, an E2 node may transmit an E2 setup request message to the RIC. An E2 node function located in the E2 node may find an RIC using an IP address of the RIC, which is set to Operation-Administration-Maintenance (OAM), and may transmit an E2 setup request message. In this case, the E2 node may request for RIC-based RRM control. For example, the E2 node may transmit to the RIC an E2 setup request message including a fact that the E2 node is operable in a zombie mode. In a subsequent step, the RIC may receive an E2 setup response message from the E2 node. The RIC may determine, from the E2 node, whether the E2 node supports the zombie mode, in other words, whether full RRM control based on the RIC is possible.

Referring to FIG. 11B, the RIC may transmit an RIC subscription request message to the E2 node. A specific xApp located in the RIC requests an RIC E2 termination function to register (or subscribe) to a specific RAN Function Definition function supported in E2. According to an embodiment, the subscription request message may include information for indicating whether the RIC performs RIC-based RRM control. For example, the subscription request message may include information for indicating whether the RIC operates as an E2SM-RIC. In addition, for example, the RIC may transmit the subscription request message including a zombie mode indicator. According to an embodiment, the RIC-based RRM control may be performed in units of a terminal or a terminal group including the terminal. As shown in FIG. 10 and FIG. 11A, the RIC-based RRM control may be performed on a terminal located in an inter-vendor zone or a common service area of CU-UPs or a group including the terminal. In this case, the subscription request message may include an ID indicating a group (hereinafter, a group identifier) or an ID for indicating a specific terminal (hereinafter, a terminal ID/UE ID).

According to an embodiment, as shown in FIG. 11B, the subscription message and an E2 setup response message may be transmitted separately. According to another embodiment, the subscription request message of this step may be transmitted by being included in the E2 setup response message of this step.

In a subsequent step, the E2 node may transmit an RIC subscription response to the RIC. An E2 node function of the E2 node may decode the subscription request message. The E2 node may identify whether the RIC is an E2SM RIC. The E2 node may identify whether the RIC operates in a zombie mode or whether it is possible to operate in a zombie mode of the E2 node.

Referring to FIG. 11B, the E2 node may transmit an E2 RIC indication message to the RIC. The E2 node and the RIC may perform an RIC indication procedure. According to embodiments of the disclosure, the RIC indication message may include a KPI report in units of UE. According to an embodiment, a message container of the RIC indication message may include a KPI report service model in units of UE. Thereafter, the RIC may perform RRM for a corresponding UE. Although not shown in FIG. 11B, the RIC may perform the RRM, and may generate a control message including specific information related to a resource allocation procedure. Accordingly, the RIC may provide control of each E2 node.

An E2SM RIC control message may be transmitted to the E2 node 610. The E2 node 610 and the RIC 640 may perform the RIC control procedure. For a control procedure of the E2 node, the RIC 640 may generate an E2SM-RIC RIC control message. For example, the E2SM-RIC RIC control message may include a message container. The message container may include a per-interface RRC message (e.g., X2 SgNB add request message).

Although FIG. 11B is described in units of UE, the measurement may be performed or reported in various units such as a UE's group/network slice, and RIC control may be performed.

Although the setup procedure, the RIC subscription procedure, the RIC indication message transmission procedure, and the RIC control message transmission procedure are described sequentially in FIG. 11B, various embodiments of the disclosure are not limited to the aforementioned order and procedure. That is, in various embodiments, the E2 node and the RIC may independently perform the E2 setup procedure. In various embodiments, the E2 node and the RIC may independently perform the subscription procedure. Meanwhile, according to an embodiment, as described above, the E2 setup response message may include the subscription request message. In some embodiments, the E2 node and the RIC may independently perform the RIC indication procedure. In addition, in various embodiments, the E2 node and the RIC may independently perform the RIC control procedure. In addition thereto, the E2 node and the RIC may perform some of the aforementioned procedures together or separately.

Currently, the E2SM-RC standard is designed for RAN control in units of UE. However, since the RAN control needs to be performed in units of cell or in units of E2 node, embodiments of the disclosure propose a method for providing control in units of cell/in units of E2 node. A method of providing control not only in units of cell but also in units of network slice may also be understood as embodiments of the disclosure. According to an embodiment, for energy saving, control may be performed in units of cell/slice/E2 node. According to an embodiment, control may be performed in units of cell/slice/E2 node for Service Level Agreement (SLA) assurance/RAN slicing, and energy saving. According to an embodiment, control may be performed in units of cell/slice/E2 node for idle mode mobility. According to an embodiment, control may be performed in units of cell/slice/E2 node for cell barring. Hereinafter, control of a service model of a cell-based E2 node is described with reference to FIG. 12A, 12B, and FIG. 12C.

Figure 12A:
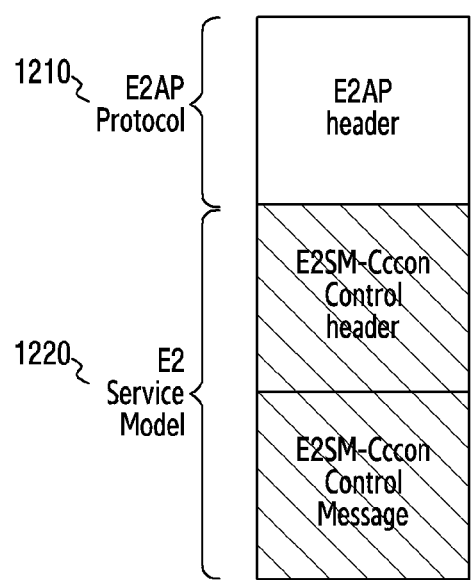
FIG. 12A illustrates an example of a cell control message according to various embodiments.

FIG. 12A illustrates an example of a cell control message according to various embodiments of the disclosure. An example of an E2SM-CC control header and E2SM-CC control message supported in an O-RAN E2 service model, used in an E2SM-CC (Cell Control), is described in FIG. 12A. Meanwhile, such a format of the control message is only for explaining an operation of the E2SM-CC according to various embodiments of the disclosure, and it does not mean that specific signaling is an essential component and shall be performed before another signaling.

The table below illustrates an E2SM-CC control header format 1 loaded to the E2SM-CC control header.

TABLE 1

| IE/Group Name | Presence | Range | IE type and reference | Semantics description |
|---|---|---|---|---|
| CHOICE Control Header Format | M | | | |
| >E2SM-CC Control Header Format 1 | | | x.x.x.x | |

The E2SM-CC control header format 1 of the table above loads and transfers information of the table below.

TABLE 2

| IE/Group Name | Presence | Range | IE type and reference | Semantics description |
|---|---|---|---|---|
| Global E2 Node ID | M | | | |
| Cell Global ID | M | | | |
| Slice ID | M | | | |
| Control Action ID | O | | | |

The Global E2 Node ID is an information element defined in the O-RAN standard, and may be used to specify a specific O-DU. The cell global ID is a cell ID including a PLMN ID, and may be used to uniquely specify a cell of an operator's network. The slice ID is an S-NSSAI value. The control action ID is an optional value, and is used to distinguish another CAC operation from a CAC operation of a specific slice of a specific cell.

The table below illustrates an E2SM-CC control message format 1.

TABLE 3

| IE/Group Name | Presence | Range | IE type and reference | Semantics description |
|---|---|---|---|---|
| CHOICE Control Message Format | M | | | |
| >E2SM-CC Control Message Format 1 | | | x.x.x.x | |

The E2SM-CC control message format 1 transfers the following IE. The slice CAC weight is a parameter for controlling a portion of a DRB of the aforementioned slice CAC, and the slice CAC is a time at which the weight of the slice CAC is applied in the O-DU. If a control message is not received additionally from the RIC during a timer duration, it is restored to an initial set value of the O-DU CAC.

TABLE 4

| IE/Group Name | Presence | Range | IE type and reference | Semantics description |
|---|---|---|---|---|
| Slice CAC Weight | M | [0 . . . 1] | | CAC weight value increase by 0.1 |
| Slice CAC Timer | M | | INTEGER Indicates the CAC Weight timer. The values are expressed in seconds.(1 . . . 7200, . . .) | Indicates the CAC Weight timer. The values are expressed in seconds. |

Figure 12B:
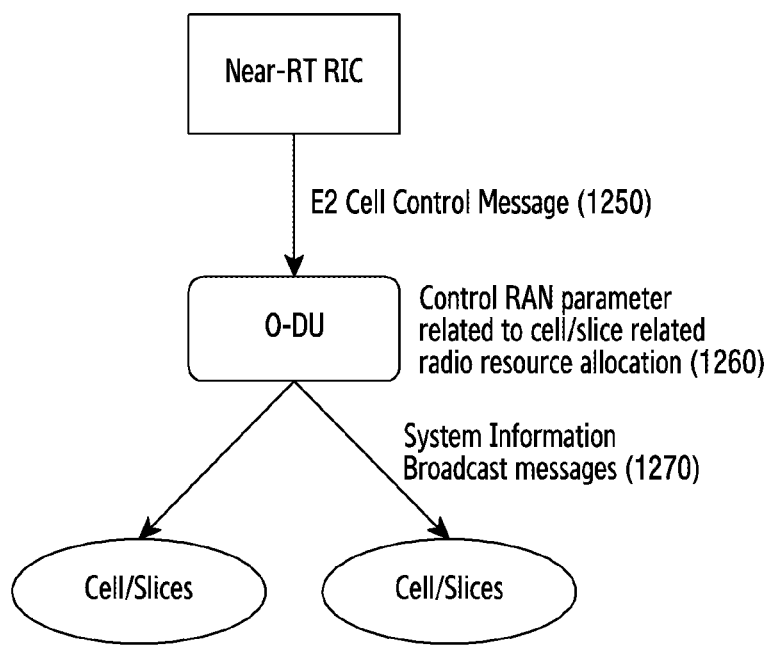
FIG. 12B illustrates an example of an E2 service mode for cell control according to various embodiments.

FIG. 12B illustrates an example of an E2 service mode for cell control according to various embodiments of the disclosure. A cell resource configuration message may be defined as an E2 control message in an E2 node (e.g., O-DU).

In operation 1250, the near-RT RIC may transmit a control message to the O-DU through an E2 interface. The control message may include cell configuration information. The control message may include an E2 node ID. The control message may include a DU ID. The control message may include cell identification information (e.g., global cell ID). The control message may include slice information (e.g., S-NSSAI) in a corresponding cell. For example, the control message may include an E2 control request message. Although not shown in FIG. 12B, in various embodiments, the near-RT RIC may receive an E2 control Ack message from the DU.

In operation 1260, the DU may control RAN parameters, based on the control message from the near-RT RIC. The RAN parameters may refer, for example, to parameters for a cell/slice related to radio resource control. Although not shown in FIG. 12B, in various embodiments, the DU may perform a report to the near-RT RIC. This report may include the number of slice CAC failures and the number of DRBs currently operating. In operation 1270, the DU may transmit the control message on an access network. Herein, the control message may refer, for example, to a message for radio resource control of a cell. For example, the control message may refer, for example, to a broadcast message or RRC message (e.g., RRC reconfiguration) of system information (e.g., SIB) of Radio Resource Control (RRC). The control message may be configured to include RAN parameters based on the operation 1260.

Figure 12C:
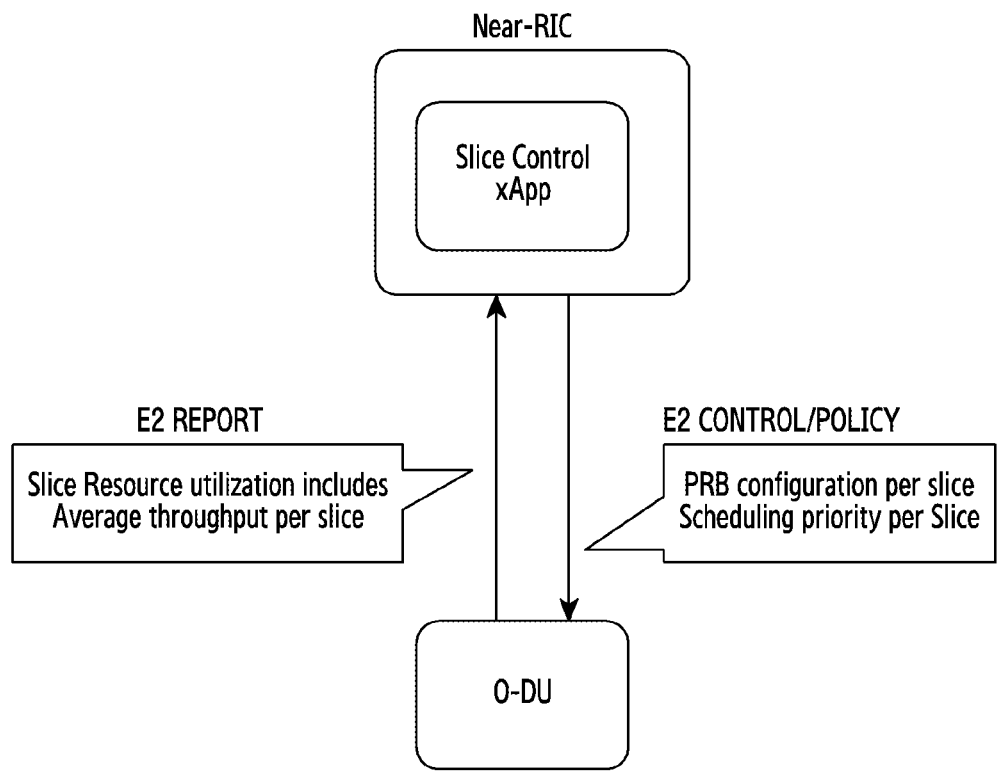
FIG. 12C illustrates an example of a resource configuration based on cell control according to various embodiments.

FIG. 12C illustrates an example of a resource configuration based on cell control according to various embodiments of the disclosure. In order to perform resource control at a level satisfying a Service Level Agreement (SLA) of a slice, slice Call Admission Control (CAC) may be used. SLA assurance may allow a closed loop control mechanism to assure the slice SLA and prevent possible violations. Embodiments of the disclosure may provide the SLA assurance in S-NSSAI for each cell level.

Referring to FIG. 12C, the DU may transmit an E2 report to the near-RT RIC. The E2 report may include information on resource utilization per slice. For example, the E2 report may include a throughput per slice. For example, the throughput may be provided in the form of an average. The DU may receive E2 control/policy from the near-RT RIC. An E2 control message or a policy setup message may include information on a priority per network slice. The E2 control message or the policy setup message may include a UL/DL PRB configuration (e.g., allocation size, allocation position) for each network slice.

Embodiments of the disclosure may dynamically optimize the UL/DL PRB configuration and a scheduling priority, based on traffic of each slice of a cell. For example, when a traffic demand for a slice is high, the near-RT RIC may increase a UL/DL PRB portion for the slice. In addition, for example, when the traffic demand for the slice is low, the near-RT RIC may decrease the UL/DL PRB portion for the slice.

Figure 13A:
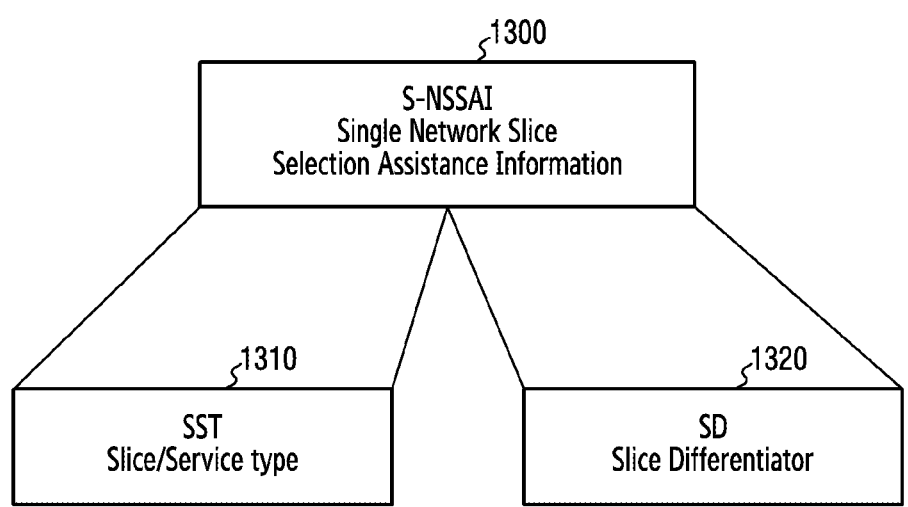
FIG. 13A illustrates an example of a slice identifier according to various embodiments.

FIG. 13A illustrates an example of a slice identifier according to various embodiments of the disclosure. According to an embodiment, the slice identifier to be subjected to call admission control in FIG. 13A may use a format of Single Network Slice Selection Assistance Information (S-MSSAI) defined in 3GPP.

Referring to FIG. 13A, an S-NSSAI 1200 may be configured as follows.

Slice/Service Type (SST) 1310
   Slice Differentiator (SD) 1320 as optional information which compensates for the SST to identify several network slices Herein, the SST 1310 may be mandatory information consisting of 8 bits, and the SD 1220 may be optional information consisting of 24 bits.

Figure 13B:
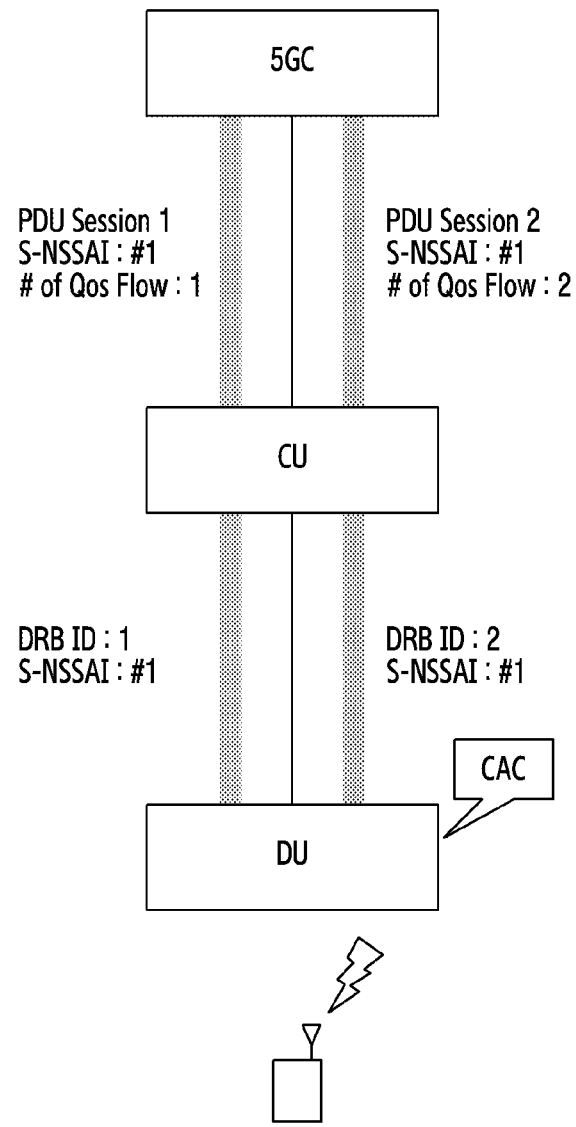
FIG. 13B illustrates an example of a relationship of a Protocol Data Unit (PDU) session Data Radio Bearer (DRB) and a Quality of Service (QoS) flow in a core network and an E2 node according to various embodiments.

FIG. 13B illustrates an example of a relationship of a Protocol Data Unit (PDU) session Data Radio Bearer (DRB) and a Quality of Service (QoS) flow in a core network and an E2 node according to various embodiments of the disclosure. A CAC function of an O-DU which performs call admission control for each S-NSSAI is illustrated in FIG. 13B when a UE according to embodiments of the disclosure is registered to 5GC and requests for the setup of the O-DU and a plurality of DRBs in a specific cell.

Referring to FIG. 13B, the S-NSSAI may be mapped to one or more PDU sessions. The S-NSSAI refers to a network slice. Herein, network slicing refers, for example, to use of a network by logically dividing the network. There may be one S-NSSAI per PDU session, and the same S-NSSAI may be associated with a plurality of PDU sessions. The PDU session may be associated with one or more QoS flows, and the PDU session may be associated with one or more DRBs. The DRB may be mapped to one or more QoS flows, and there may be one S-NSSAI value per DRB.

Each DRB may include an S-NSSAI for each DRB ID.

TABLE 5

| DRB to Be Setup List | | 0 . . . 1 |
|---|---|---|
| >DRB to Be Setup Item IEs | | 1 . . . <maxnoofDRBs> |
| >>DRB ID | M | |
| >>CHOICE QoS Information | M | |
| >>>E-UTRAN QoS | M | |
| >>>DRB Information | | 1 |
| >>>>DRB QoS | M | |
| >>>>S-NSSAI | M | |

A group may be configured between DRBs having the same S-NSSAI. The DRBs in this group may be the same PDU session. Up to 8 S-NSSAIs per UE are possible, and the number of corresponding DRBs and DRB ID lists may be defined for each S-NSSAI. A slice index and a DRB group (i.e., PDU session) may be mapped through the PLMN and the S-NSSAI.

When the UE requests the 5GC to perform call setup, the AMF may allocate an S-MSSAI per specific PDU session. For example, the S-NSSAI may be mapped to a plurality of DRB/QoS flows. A first PDU session associated with the S-NSSAI may include one QoS flow, and a second PDU session associated with the S-MSSAI may include two QoS flows. The O-DU may perform Call Admission Control (CAC) as much as DRB capacity corresponding to the number of per-S-NSSAI DRBs received through an F1 UE context setup request message and supportable by the O-DU.

In an embodiment, a plurality of DRB setup requests may occur in a single UE. In this case, the DU may perform CAC for each S-NSSAI. Since the DU receives a signal in units of DRB, the DRB of the same S-NSSAI may apply the same slice. DRBs of Stand Alone (SA) call are targets.

More specifically, when a DRB setup request of a new UE occurs, the DU may identify an S-NSSAI of the requested DRB. The DU may identify the number of DRBs of a network slice, corresponding to the S-NSSAI. In this case, the DU may identify whether a sum of the number of DRBs currently allocated to the network slice and the number of DRBs requested in the network slice is greater than an allocation portion of the network slice. Herein, for the network slice, if the sum of the number of DRBs currently allocated and the number of the requested DRBs is less than the allocation portion (or also referred to as a DRB threshold) of the network slice, the DU may accept a request of the network slice. However, for the network slice, if the sum of the number of DRBs currently allocated and the number of requested DRBs is less than the allocation portion of the network slice, the DU may reject the request of the network slice. A specific example is described with reference to FIG. 13C.

Figure 13C:
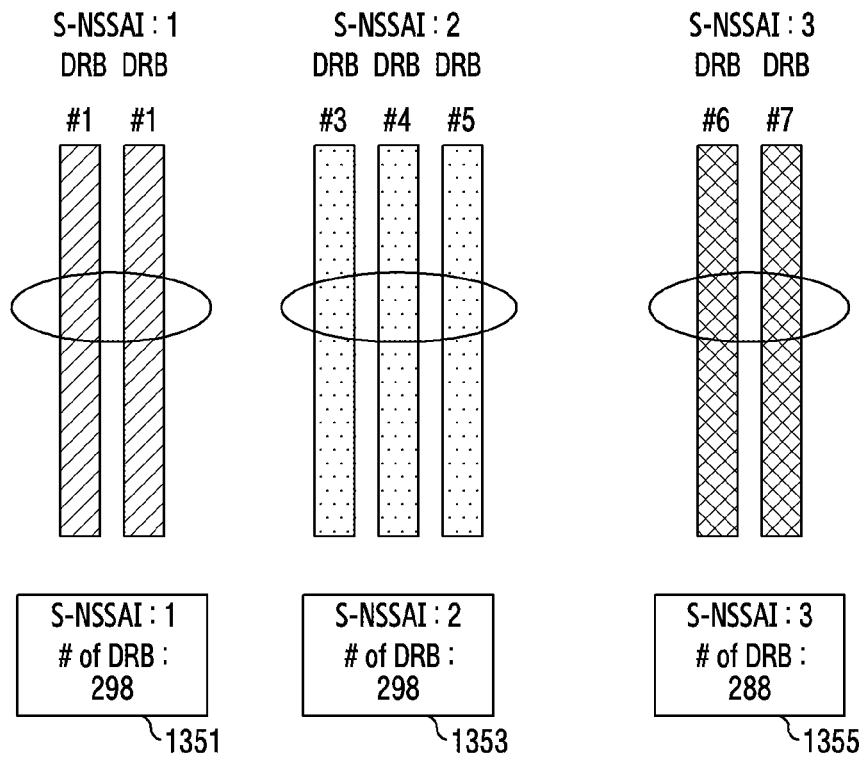
FIG. 13C illustrates an example of Call Admission Control (CAC) for a network slice according to various embodiments.

FIG. 13C illustrates an example of CAC for a network slice according to various embodiments of the disclosure. Referring to FIG. 13C, the number of DRBs allocatable to each network slice may be 299. The number of DRBs currently allocated to a first slice 1351 may be 298. Upon receiving a request for two DRBs, the DU may reject a request of DRB #1 and DRB #2. The number of DRBs currently allocated to a second slice 1353 may be 298. Upon receiving a request for three DRBs, the DU may reject a request of DRB #3, DRB #4, and DRB #5. The number of DRBs currently allocated to a third slice 1355 may be 288. Upon receiving a request for two DRBs, the DU may receive a request of DRB #6 and DRB #7.

A resource may be more efficiently allocated due to the instruction of network slicing. In order to perform resource control at a level satisfying a Service Level Agreement (SLA) of a slice, slice Call Admission Control (CAC) may be used. In the slice CAC, an available resource for each slice is differentiated, and is allowed to be used within a resource allocated for each slice. A DRB usage acceptable for each slice may be set. The CAC may be performed within the available resource for each slice. In addition, the slice CAC may support slice resource isolation.

In order to operate the aforementioned slice CAC more accurately and effectively, embodiments of the disclosure propose a slice CAC scheme based on a near-RT RIC of an O-RAN. Hereinafter, an example of control messages of an RIC (e.g., RIC for E2SM-CC or cell/E2 node control) according to various embodiments of the disclosure is described with reference to FIG. 14 and FIG. 15.

Figure 14:
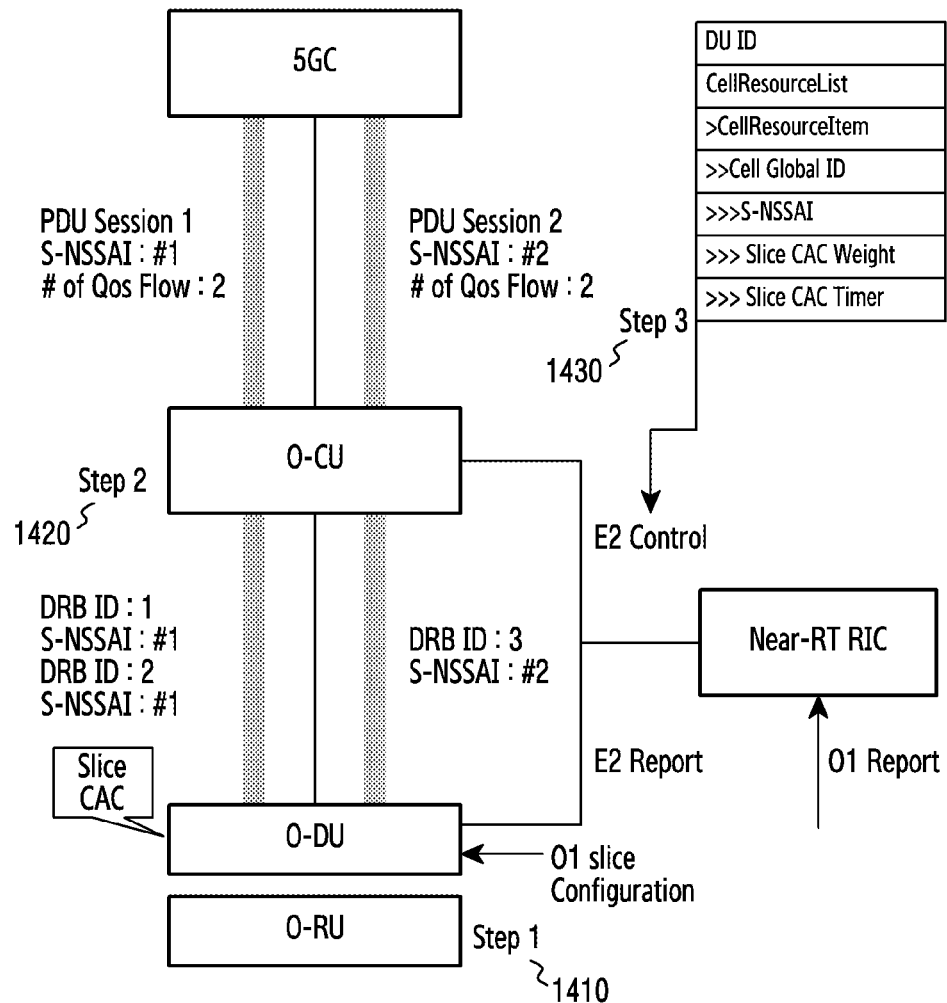
FIG. 14 illustrates an example of control of slice CAC according to various embodiments.

FIG. 14 illustrates an example of control of slice CAC according to embodiments of the disclosure. An example of operations for slice CAC provided by a 5G RAN, a 5G Core (5GC) network, and a near-RT RIC is described with reference to FIG. 14.

In step 1410, when a first 5G RAN/5G core network is driven, each network node configuration information and cell configuration information related thereto may be acquired using an EMS system.

In step 1420, when a UE attempts a call connection, an AMF of the 5GC may load S-NSSAI information available in a PDU session to an initial context setup message and transfer it to the O-CU together with QoS information. The O-CU may load an S-NSSAI value to an F1 UE context setup message and transfer it to the O-DU. In this case, the O-DU executes admission control to know whether DRB allocation is available for the S-NSSAI which is desired to be used by the UE and requested by the O-CU. If the number of available DRBs does not reach a limit for the designated S-NSSAI, a call setup procedure may succeed.

In step 1430, the O-DU may perform slice CAC, based on signaling with the near-RT RIC. According to an embodiment, the near-RT RIC may receive a per-slice DBR counter monitoring message periodically transmitted from the O-DU. When there is a need to decrease/increase the number of DRBs to optimize the number of DRBs for a specific slice, an E2AP control message defined in the O-RAN may be transmitted to the DU by loading a DU ID indicating a specific O-DU, a cell global ID indicating a specific cell, an S-NSSAI supported by the specific cell, a weight value optimized for a slice of the specific cell, and a time slice CAC timer value to which the weight value is applied.

That is, upon determining that it is necessary to additionally reflect the per-slice CAC weight, the near-RT RIC may transfer a control message to the DU. The control message according to embodiments of the disclosure may include a CAC weight and a duration. The CAC weight may refer, for example, to a weight value to be additionally reflected in a portion allocated to a network slice. The duration may refer, for example, to a time to which the CAC weight is applied.

In addition to the aforementioned information, the control message may include a variety of identification information to indicate a control target. According to an embodiment of the disclosure, the control message may include an E2 node ID or a DU ID to indicate a DU which is a control target. In addition, according to an embodiment of the disclosure, the control message may include an S-NSSAI to indicate a slice which is a CAC target. In addition, according to an embodiment of the disclosure, the control message may also include cell information (e.g., cell global IC) to indicate a cell which is a CAC target.

The DU may transmit to the near-RT RIC a report based on the slice CAC. The report may include a Fail report. According to an embodiment, when the Fail report occurs based on the slice CAC, the DU may transmit to the near-RT RIC the report based on the slice CAC. That is, whenever a designated event occurs, the DU may transmit to the near-RT RIC the report based on the slice CAC. In addition, according to an embodiment, the DU may periodically transmit to the near-RT RIC the report based on the slice CAC. For example, the DU may periodically report the number of failures caused by the slice CAC. The number of failures caused by the CAC may be reported with a separate period from statistics, and may be reported through a separate path. According to an embodiment, the DU may report the number of per-slice DRBs to the near-RT RIC. The number of per-slice DRBs may be reported whenever an event occurs, or may be reported periodically.

In addition to the aforementioned report, according to an embodiment, the DU may perform the report to the near-RT RIC whenever a slice CAC parameters is changed.

Figure 15:
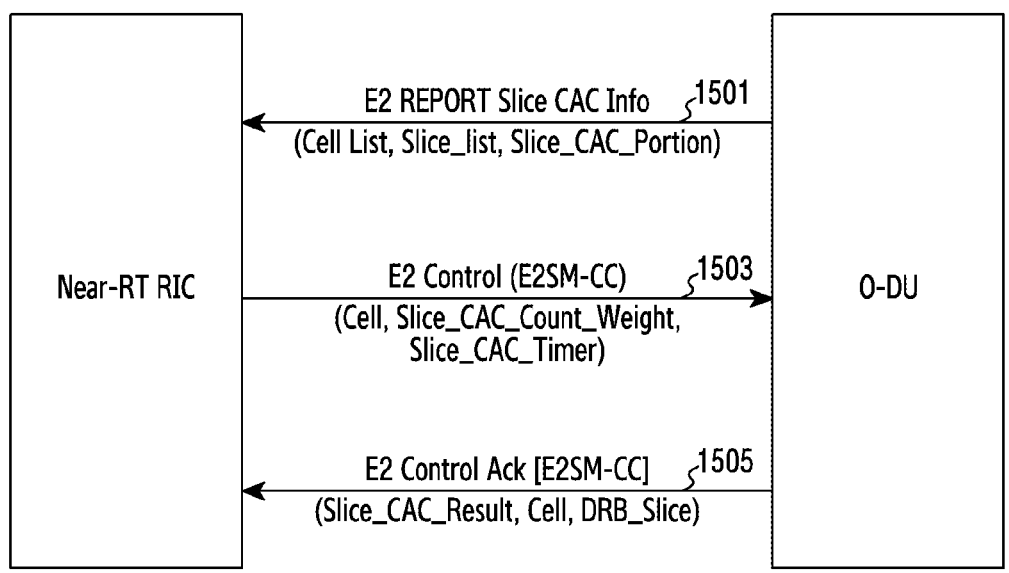
FIG. 15 illustrates an example of signaling between a near-RT RIC and an O-RAN Distributed Unit (O-DU) according to various embodiments.

FIG. 15 illustrates an example of signaling between a near-RT RIC and an O-DU according to various embodiments of the disclosure. A slice CAC control operation loop between the O-DU and the RIC is illustrated in detail in FIG. 15.

Referring to FIG. 15, in step 1501, the DU may transmit slice CAC information to the near-RT RIC. The slice CAC information may include a cell list, a slice list, and information on a slice CAC portion.

In step 1503, the near-RT RIC may transmit an E2 control message to the DU. The E2 control message may refer to the aforementioned format of FIG. 12, as an E2SM-CC format. According to an embodiment, the E2 control message may include cell information for slice CAC. According to an embodiment, the E2 control message may include a weight for slice CAC. Although the weight is described in the disclosure, it is apparent that per-slice resource allocation control is possible by referring to summation/subtraction or an absolute value in addition to the weight. In addition, according to an embodiment, the E2 control message may include a time value for slice CAC. The timer may refer, for example, to a time at which the aforementioned weight information is applied for slice CAC.

A portion described in the disclosure refers, for example, to a resource allocable threshold. That is, a portion corresponding to a network slice may refer, for example, to the number of DRBs allocatable to the network slice. The O-DU may periodically transmit portion information of a DRB possibly provided from a slice of a specific cell (i.e., the number of DRBs supportable at a current time among all DRBs) to the RIC through an E2 indication message of an E2 report service. According to an embodiment, information required for the E2 indication message may include a global cell ID including a PLMN ID, an S-NSSAI, and CAC DRB portion information.

The RIC which has received the E2 indication message may optimize the number of slice DRBs per cell, based on slice information per cell and a value which satisfies a Service Level Agreement (SLA) of a specific slice set by an operator. For example, it is assumed that the maximum number of DRBs supported by a slice #1 is 12, but in order to satisfy an SLA updated by the operator, only up to 10 DRBs shall be accepted to satisfy a specific bandwidth. In this case, the number of portions of a DRB of a specific slice per specific cell shall be decreased from 12 to 10.

The near-RT RIC may control the number of DRBs allocated to the slice, based on the following condition.

$$slicePortionDrbCount[slice] = maxCellDrbCount * SlicePortion[slice] * CAC\_Count\_Weight[slice]$$

- slicePortionDrBCount[slice] is an optimized maximum DRB number used in the O-DU, in a network slice designated by an index of '[slice]'.
- maxCellDrbCounts is a maximum DRB number stored in the O-DU and supportable per cell.
- SlicePortion[slice] is a percentage value and is a portion of a DRB in which the network slice designated by the index of '[slice]' in a specific cell is available.
- CAC_Count_Weight[slice] is a CAC adjustment value optimized by the RIC for the network slice designated by the index of '[slice]'. For example, it is possibly set to 5% — 100% in units of 1% (0.01) in a CAC operation.

The RIC which has calculated the optimized value of CAC_Count_Weight[slice] transmits, to the O-DU, cell information, slice information, CAC count weight information, and a Slice_CAC_Timer value to which CAC_Count_Weight information is applied. Herein, the Slice_CAC_Timer value may be configured to restore to an initial set value when communication between the O-DU and the RIC is disconnected or when the RIC does not additionally provide an SLA assurance service.

According to embodiments of the disclosure, for the slice CAC, the DU may include control information for the slice CAC, as a policy through E2. The control information may include weight information and time information in addition to cell information (cell ID) indicating a control target and slice information (e.g., S-NSSAI). Slice_CAC_Count_Weight shown in FIG. 15 may refer, for example, to weight information to be additionally reflected in the number of available DRBs per existing slice. In Slice_CAC_Timer shown in FIG. 15, Slice_CAC_Count_Weight may refer, for example, to information of time for which weight information is valid.

According to an embodiment, upon receiving a new E2 policy before the timer expires, the DU may apply the newly received Slice_CAC_Count_Weight and Slice_CAC_Timer. In this case, according to an embodiment, the DU may apply a timer value through initialization ever since a time of receiving the new E2 policy. According to an embodiment, when the timer expires, Slice_CAC_Count_Weight may be set to 1.

In step 1505, the DU may transmit an E2 control acknowledge message to the near-RT RIC. According to an embodiment, the E2 control acknowledge message may include result information for the slice CAC. According to an embodiment, the E2 control acknowledge message may include cell information which is a control target. According to an embodiment, the E2 control acknowledge message may include per-slice DRB information.

When CAC_Count_Weight[slice] specified in the E2 control message is successfully applied, the O-DU may selectively omit the E2 control Acknowledge (Ack) message. If it is impossible to apply CAC_Count_Weight[slice] to a CAC function, the O-DU may transfer a cause value to the RIC.

Meanwhile, although the weight is described in the disclosure, it is apparent not to exclude that per-slice resource allocation control is possible by referring to summation/subtraction or an absolute value in addition to the weight.

According to embodiments of the disclosure, the control message of FIG. 12B may include DRB allocation control information for slice CAC. The DRB allocation control information may refer, for example, to information for controlling the number of DRBs allocable to a corresponding slice for CAC. The number of DRBs allocatable to the corresponding slice may refer, for example, to the per-slice DRB threshold number (or DRB portion) mentioned in FIG. 13A to FIG. 15. According to an embodiment, the DRB allocation control information may include weight information. The weight information may refer, for example, to a weight value to be multiplied by the allocatable threshold number. For example, the weight information may be set to 1% scale. According to an embodiment, the weight information may be slice-specific. According to an embodiment, the DRB allocation control information may include time information. The time information may refer, for example, to a duration to which the weight information is applied. According to an embodiment, the time information may be slice-specific. Meanwhile, when the time information is not included in the DRB allocation control information, according to an additional embodiment, a default time value may be applied.

According to embodiments of the disclosure, the DU may perform CAC control, based on a control message from the near-RT RIC. The DU may determine whether to accept or reject a DRB setup request from a UE, based on the control message from the near-RT RIC. The near-RT RIC may determine an optimal DRB number in a slice of a corresponding DU, based on an operator's requirement, a core network, an RAN state, and statistics information for each E2 node. The determined optimal DRB number of the slice may be transferred to the DU through the aforementioned control message. The DU may effectively perform the slice CAC by applying defined parameters (e.g., weight, time information) to the control message.

In various embodiments, the DU may provide a report to the near-RT RIC. The report may include, for example, the number of failures of the slice CAC and the number of DRBs currently operating. According to an embodiment, the control message may include a response corresponding to a DRB setup request of the UE. For example, when the DRB allocation is requested to exceed the number of DRBs controlled by the near-RT RIC, the DU may transmit a reject message to the UE. On the contrary, when the DRB allocation is requested within a range not exceeding the number of DRBs controlled by the near-RT RIC, the DU may transmit an accept message to the UE.

Under the control of the O-DU of the RIC according to various embodiments of the disclosure, dynamic control is possible for a resource of a slice of a network slice, and a resource of a cell may be optimized.

Although operations of respective entities are described in the disclosure by naming an operation mode as a "zombie mode" to describe an operation of an E2 node, embodiments of the disclosure are not limited thereto. In addition to the zombie mode, as a mode for performing functions of a CU or DU in an alternate manner, it will be apparent that other names of embodiments of the disclosure may also be used.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a distributed unit (DU), comprising:
   receiving, from a radio access network (RAN) intelligent controller (RIC), a control message including control information for controlling data radio bearer (DRB) allocation in each network slice;
   identifying, from a request message for setting one or more DRBs of a terminal, single network slice selection assistance Information information (S-NSSAI) of the one or more DRBs; and
   setting a number of DRBs allocatable in a network slice corresponding to the S-NSSAI, based on the control information,
   wherein the control information includes weight information including a weight value applied to a threshold for the number of DRBs allocatable in the network slice of the DU.

2. The method of claim 1,
   wherein the control information further includes timer information, and
   wherein the timer information includes information on a time duration to which the weight value is applied.

3. The method of claim 1, further comprising:
   determining whether to accept or reject a request for the setting of the one or more DRBs, based on the set number of DRBs;
   in case that the request is accepted, transmitting an accept message to the terminal; and
   in case that the request is rejected, transmitting a reject message to the terminal.

4. The method of claim 1, further comprising transmitting to the RIC an E2 report including a cell list of the DU, a slice list, and information on an allocation portion of each network slice.

5. A method performed by an RIC, comprising:
   generating a control message including control information for controlling DRB allocation for each network slice; and
   transmitting the control message to a DU,
   wherein the control information is used to adjust a number of DRBs allocatable in a network slice of the DU, and
   wherein the control information includes weight information including a weight value applied to a threshold for the number of DRBs allocatable in the network slice of the DU.

6. The method of claim 5,
   wherein the control information further includes timer information, and
   wherein the timer information includes information on a time duration to which the weight value is applied.

7. The method of claim 5, further comprising receiving from the DU an E2 report including a cell list of the DU, a slice list, and information on an allocation portion of each network slice.

8. A distributed unit (DU), comprising:
   a transceiver;
   a processor; and
   memory storing instructions that, when executed by the processor, cause the DU to:
      receive a control message from an RIC, wherein the control message includes control information for controlling DRB allocation in each network slice;
      identify, from a request message for setting one or more DRBs of a terminal, S-NSSAI of the one or more DRBs; and
      set a number of DRBs allocatable in a network slice corresponding to the S-NSSAI, based on the control information,
   wherein the control information includes weight information including a weight value applied to a threshold for the number of DRBs allocatable in the network slice of the DU.

9. The DU of claim 8,
   wherein the control information further includes timer information, and
   wherein the timer information includes information on a time duration to which the weight value is applied.

10. The DU of claim 8, wherein the memory further comprises the instructions that, when executed by the processor, cause the DU to:
    determine whether to accept or reject a request for the setting of the one or more DRBs, based on the set number of DRBs;
    transmit an accept message to the terminal when the request is accepted; and
    transmit a reject message to the terminal when the request is rejected.

11. The DU of claim 8, wherein the memory further comprises the instructions that, when executed by the processor, cause the DU to transmit to the RIC an E2 report including a cell list of the DU, a slice list, and information on an allocation portion of each network slice.

12. A radio access network (RAN) intelligent controller (RIC), comprising:
    a transceiver;
    a processor; and
    memory storing instructions that, when executed by the processor, cause the RIC to:
       generate a control message including control information for controlling DRB allocation for each network slice; and
       transmit the control message to a DU,
    wherein the control information is used to adjust a number of DRBs allocatable in a network slice of the DU, and
    wherein the control information includes weight information including a weight value applied to a threshold for the number of DRBs allocatable in the network slice of the DU.

13. The RIC of claim 12,
wherein the control information further includes timer information, and
wherein the timer information includes information on a time duration to which the weight value is applied.

14. The RIC of claim 12, wherein the memory further comprises the instructions that, when executed by the processor, cause the RIC to receive from the DU an E2 report including a cell list of the DU, a slice list, and information on an allocation portion of each network slice.

* * * * *